(12) United States Patent
Forry et al.

(10) Patent No.: US 6,923,998 B2
(45) Date of Patent: Aug. 2, 2005

(54) EDGE COATED GASKETS AND METHOD OF MAKING SAME

(75) Inventors: John S. Forry, Lancaster, PA (US); Brian C. Lehr, Pequea, PA (US); Dennis M. Dempsey, Lancaster, PA (US); Jeff Barrall, Lititz, PA (US); Linda L. Sload, Lancaster, PA (US); Christopher L. Morris, Oxford, PA (US)

(73) Assignee: Interface Solutions, Inc., Lancaster, PA (US)

( * ) Notice: Subject to any disclaimer, the term of this patent is extended or adjusted under 35 U.S.C. 154(b) by 108 days.

(21) Appl. No.: 10/392,266

(22) Filed: Mar. 18, 2003

(65) Prior Publication Data

US 2004/0007828 A1 Jan. 15, 2004

Related U.S. Application Data

(60) Division of application No. 09/519,653, filed on Mar. 6, 2000, now Pat. No. 6,626,439, which is a continuation-in-part of application No. 08/920,662, filed on Aug. 29, 1997, now Pat. No. 6,247,703, and a continuation-in-part of application No. 08/920,663, filed on Aug. 29, 1997, now Pat. No. 6,093,467, and a continuation-in-part of application No. 09/110,354, filed on Jul. 6, 1998, now Pat. No. 6,268,020, which is a continuation-in-part of application No. 08/920,663, filed on Aug. 29, 1997, now Pat. No. 6,093,467, and a continuation-in-part of application No. 09/093,084, filed on Jun. 8, 1998, now Pat. No. 6,241,253.

(51) Int. Cl.$^7$ .................................................. B05D 7/22
(52) U.S. Cl. ....................... 427/183; 427/181; 427/195; 427/231; 427/284
(58) Field of Search ................................. 427/181, 183, 427/195, 231, 284, 429, 447, 421, 422, 425

(56) References Cited

U.S. PATENT DOCUMENTS

| 448,343 | A | 3/1891 | Holway |
| 1,772,173 | A | 8/1930 | Yates .......................... 277/627 |
| 2,070,918 | A | 2/1937 | Peterson ........................ 288/1 |
| 2,289,620 | A | 7/1942 | Bernstein .................... 277/592 |

(Continued)

FOREIGN PATENT DOCUMENTS

| DE | 1583530 | 3/1978 |
| DE | 002831217 | 1/1980 |

(Continued)

*Primary Examiner*—Fred J. Parker
(74) *Attorney, Agent, or Firm*—Womble Carlyle Sandridge & Rice, PLLC

(57) ABSTRACT

An edge coated gasket includes a base sheet made of compressible gasket material and having opposed faces and an interior edge surrounding and defining an aperture. An edge coating of polymer or other material is disposed on and seals the interior edge of the base sheet and may project beyond the facial planes of the base sheet to define protruding rims extending around the aperture. Face coatings may also be applied to one or more of the faces extending in relatively narrow strips around the aperture of the base sheet. When clamped between flange surfaces, the edge coating engages, conforms to, and seals against the flange surfaces to provide a seal against both interfacial and intersticial migration of fluid past the gasket. At the same time, the inherently good compression failure resistance of the compressible gasket material of the base sheet is preserved. Thus, a gasket with enhanced sealability and compression failure resistance is provided. A unique method of making such an edge coated gasket is also disclosed.

19 Claims, 10 Drawing Sheets

U.S. PATENT DOCUMENTS

| | | | | |
|---|---|---|---|---|
| 2,681,241 | A | 6/1954 | Aukers | 288/21 |
| 3,302,953 | A | 2/1967 | Glasgow | 277/180 |
| 3,353,666 | A | 11/1967 | Jensen | 206/65 |
| 3,355,181 | A | 11/1967 | Olson | 277/180 |
| 3,360,983 | A | 1/1968 | Smith | |
| 3,447,361 | A | 6/1969 | Schmitt | |
| 3,606,360 | A | 9/1971 | Barker | |
| 3,655,210 | A | 4/1972 | Farnam et al. | 277/235 |
| 3,661,401 | A | 5/1972 | Farnam | 277/227 |
| 3,729,205 | A | 4/1973 | Kwok | 277/229 |
| 3,760,337 | A | 9/1973 | Johnson | |
| 3,785,856 | A | 1/1974 | Gotoh | 277/944 |
| 3,837,654 | A | 9/1974 | Hall | |
| 3,837,657 | A | 9/1974 | Farnam et al. | 277/1 |
| 3,854,736 | A | 12/1974 | Farnam | 277/204 |
| 3,869,393 | A | 3/1975 | Booker | |
| 3,890,183 | A | 6/1975 | Farnam | 156/193 |
| 3,950,576 | A | 4/1976 | Desverchere | 427/284 |
| 3,970,322 | A | 7/1976 | Stecher et al. | 277/235 |
| 4,103,913 | A | 8/1978 | McDowell | 277/235 |
| 4,115,609 | A | 9/1978 | Denman | |
| 4,272,085 | A | 6/1981 | Fujikawa et al. | 277/235 |
| 4,300,779 | A | 11/1981 | DeCore et al. | 277/235 |
| 4,431,197 | A | 2/1984 | Kirkwood | 277/1 |
| 4,434,989 | A | 3/1984 | Beyer et al. | 277/235 |
| 4,499,135 | A | 2/1985 | Mitchell et al. | 428/137 |
| 4,548,165 | A | 10/1985 | Vorobiev et al. | 123/41.84 |
| 4,600,201 | A | 7/1986 | Lonne et al. | 277/1 |
| 4,601,476 | A | 7/1986 | Usher et al. | 277/230 |
| 4,629,919 | A | 12/1986 | Merkle | |
| 4,635,949 | A | 1/1987 | Lucas et al. | 277/235 |
| 4,691,928 | A | 9/1987 | Abele | 277/235 |
| 4,741,965 | A | 5/1988 | Zerfass et al. | 428/447 |
| 4,743,421 | A | 5/1988 | McDowell et al. | 264/129 |
| 4,746,130 | A | 5/1988 | Abele | 277/228 |
| 4,795,166 | A | 1/1989 | Irmler | 277/1 |
| 4,834,279 | A | 5/1989 | McDowell et al. | |
| 4,888,979 | A | 12/1989 | Steeper | |
| 4,932,673 | A | 6/1990 | Domnikov et al. | 277/235 |
| 4,956,525 | A | 9/1990 | Wilk | |
| 5,033,756 | A | 7/1991 | Sixsmith et al. | 277/188 |
| 5,082,297 | A | 1/1992 | Flasher | 277/230 |
| 5,112,664 | A | 5/1992 | Waterland, III | 428/76 |
| 5,145,190 | A | 9/1992 | Boardman | 277/166 |
| 5,150,910 | A | 9/1992 | Udagawa | 277/235 |
| 5,180,631 | A | 1/1993 | Amano | 428/236 |
| 5,194,696 | A | 3/1993 | Read | 174/65 |
| 5,240,766 | A | 8/1993 | Foster | 428/280 |
| 5,286,574 | A | 2/1994 | Foster | 428/457 |
| 5,333,367 | A | 8/1994 | Ashbrook | |
| 5,375,453 | A | 12/1994 | Rudd et al. | |
| 5,437,767 | A | 8/1995 | Halout et al. | 162/145 |
| 5,518,257 | A | 5/1996 | Breaker | 277/180 |
| 5,534,295 | A | 7/1996 | Schlichter et al. | |
| 5,536,565 | A | 7/1996 | Halout et al. | 428/283 |
| 5,540,566 | A | 7/1996 | Ishizaki et al. | 417/297 |
| 5,551,706 | A | 9/1996 | Barna et al. | |
| 5,564,715 | A | 10/1996 | Wallace | |
| 5,607,763 | A | 3/1997 | Matsuda | |
| 5,615,898 | A | 4/1997 | Clark et al. | |
| 5,667,227 | A | 9/1997 | Boldt | 277/227 |
| 5,700,017 | A | 12/1997 | Tensor | 277/235 |
| 5,725,876 | A | 3/1998 | Mantelle et al. | |
| 5,749,586 | A | 5/1998 | Abe et al. | 277/608 |
| 5,902,956 | A | 5/1999 | Spies et al. | |
| 5,938,208 | A | 8/1999 | Yoshida et al. | |
| 6,092,811 | A | 7/2000 | Bojarczuk et al. | |
| 6,093,467 | A | 7/2000 | Forry | |
| 6,247,703 | B1 | 6/2001 | Forry et al. | |
| 6,268,020 | B1 * | 7/2001 | Forry et al. | |
| 6,273,882 | B1 | 8/2001 | Whittier et al. | |
| 6,286,839 | B1 | 9/2001 | Mitsui et al. | |
| 6,422,575 | B1 | 7/2002 | Czaplicki et al. | |

FOREIGN PATENT DOCUMENTS

| | | |
|---|---|---|
| DE | 2711022 | 3/1981 |
| DE | 3433376 | 9/1984 |
| DE | 8520709.8 | 7/1985 |
| DE | 8624855.3 | 12/1987 |
| DE | 003711664 | 10/1988 |
| DE | 003719189 | 12/1988 |
| DE | 003903918 | 8/1990 |
| DE | 4116822 | 11/1992 |
| DE | 4211076 | 10/1993 |
| DE | 4417840 | 11/1995 |
| EP | 0041906 | 12/1981 |
| EP | 0177709 | 8/1985 |
| EP | 0202909 | 11/1986 |
| EP | 000487369 | 5/1992 |
| EP | 000499551 | 8/1992 |
| EP | 0790428 | 2/1997 |
| EP | 0766500 | 4/1997 |
| EP | 0899488 | 3/1999 |
| EP | 0899489 | 3/1999 |
| EP | 0964189 | 12/1999 |
| GB | 1087616 | 10/1967 |
| GB | 1357586 | 6/1974 |
| GB | 2019507 | 10/1979 |
| GB | 1583530 | * 1/1981 |
| GB | 2091824 | 8/1982 |
| GB | 2163496 | 2/1986 |
| GB | 0179995 | 3/1989 |
| GB | 2328724 | 3/1999 |
| GB | 2328725 | 3/1999 |
| GB | 2330182 | 4/1999 |
| WO | WO 89/11608 | 11/1989 |
| WO | WO 01/66978 | 9/2001 |
| WO | WO 02/08642 | 1/2002 |

* cited by examiner

EDGE COATED GASKETS AND METHOD OF MAKING SAME

CROSS-REFERENCE TO RELATED APPLICATIONS

This Application is a divisional of U.S. patent application Ser. No. 09/519,653 filed on Mar. 6, 2000 and entitled "Edge Coated Gaskets and Method of Making Same," now U.S. Pat. No. 6,626,439, which, in turn, is a continuation-in-part of and claims the benefit of priority under 35 USC §120 to all of the following applications: application Ser. No. 08/920,662, filed on Aug. 29, 1997, entitled "High-Pressure Compression Failure Resistant and High Sealing Gasket, " now U.S. Pat. No. 6,247,703; application Ser. No 08/920,663, filed on Aug. 29, 1997, entitled "High Sealing Gaskets, " now U.S. Pat. No. 6,093,467; application Ser. No. 09/110,354, filed on Jul. 6, 1998, entitled "Method of Fabricating High Sealing Gaskets," now U.S. Pat. No. 6,268,020; which is a continuation-in-part of application Ser. No. 08/920,663, now U.S. Pat. No. 6,093,467, set forth above; and application Ser. No. 09/093,084, filed on Jun. 8, 1998, entitled "Edge Coated Soft Gasket, " now U.S. Pat. No. 6,241,253.

BACKGROUND OF THE INVENTION

1. Field of the Invention

The present invention relates generally to sealing devices, and more particularly to gaskets such as gaskets for use in gasoline and diesel engines, compressors, oil coolers, and other machinery.

2. Description of the Related Art

Gaskets have long been used to seal interfaces between components in a wide variety of machines and especially in gasoline and diesel engines. For example, head gaskets seal between the heads of an engine and the engine block, oil pan gaskets seal the interface between the oil pan and the block, and water pump gaskets seal around the ports of a water pump where the water pump is attached to the engine block. Most gaskets are specifically designed for their particular intended use. For instance, head gaskets are designed to seal against the high pressures and temperatures and the generally caustic environment within the cylinders of an engine. On the other hand, water pump gaskets must seal against leakage of coolant, which may consist of a water and anti-freeze mixture that is heated and under pressure. Many if not most automotive gaskets traditionally have been made of a compressible fibrous gasket sheet material that is die-cut to the required gasket shape.

In general, two key performance characteristics required of most compressible gaskets include compression failure resistance and sealability. Compression failure resistance refers to the ability of a gasket to withstand high compression forces when clamped between two flange surfaces without crushing, deforming, or yielding to the point that the mechanical properties of the gasket material and ultimately the seal provided by the gasket are compromised. Sealability refers to a gasket's ability to resist or prevent leakage of fluid both between the gasket faces and the flanges between which the gasket is clamped (hereinafter referred to as interfacial leakage) and through the gasket material itself (hereinafter referred to as intersticial leakage).

Leakage can be of particular concern with compressible fibrous gaskets, which generally are fabricated from sheets of material composed of fiber, filler, and a binder. Because of their fibrous nature and because apertures of the gasket typically are die-cut, the gasket edges surrounding the apertures tend to be somewhat porous. Since these porous edges usually are exposed to the fluid being sealed, intersticial leakage can be a particular problem with fibrous gaskets. Interfacial leakage can be caused by compression failure of the gasket material or by rough or warped flange surfaces. Thin flanges and poor bolt placement can result in regions of substantially reduced compression stress on a gasket, which also can lead to interfacial leakage.

In some instances, the sealability of a gasket can be enhanced by providing all of the surfaces of the gasket with a coating or by impregnating the gasket with a resin. Fibrous gaskets are particularly likely to have such treatments since, in many cases, the porous material of the gasket itself, although compression failure resistant, is subject to interstitial and interfacial leakage as a result of the failure mechanisms discussed above. U.S. Pat. No. 3,661,401 discloses a gasket having a coating that covers both the exposed gasket faces and the edges that surround and define various internal apertures of the gasket. U.S. Pat. No. 4,499,135 discloses a fibrous gasket that is impregnated with a silicone resin to improve its resistance to leakage of water-antifreeze mixtures. Similarly, U.S. Pat. No. 4,600,201 discloses a gasket impregnated with a polymerizable liquid impregnating agent to enhance sealability.

While coating and impregnation can improve the sealability of a gasket, unfortunately they inherently tend to degrade the compression failure resistance of the gasket. This is because, among other things, the coating and impregnating agents, which themselves exhibit good sealability but poor compression failure resistance, tend to penetrate and become a part of the gasket material. This reduces the gasket's overall compression failure resistance and thus reduces the ability of the gasket to function well under higher flange pressures where compression failure is more likely. As a result, coated and impregnated gaskets such as those disclosed in U.S. Pat. Nos. 3,661,401, 4,499,135 and 4,600,201 can perform poorly under high flange pressures, which severely limits the applications in which such gaskets can be used.

Other gaskets include special fillers to enhance their sealability. For example, U.S. Pat. No. 5,240,766 discloses a soft porous gasket sheet material formed from fiber, a binder, and a filler that provides enhanced sealability at higher temperatures. U.S. Pat. Nos. 5,536,565 and 5,437,767 also describe a gasket sheet material formed from fiber and a gel-forming mineral filler that provides the gasket with enhanced sealing properties, especially against polar liquids. While such fillers, like coatings and impregnations, can improve the sealability of gaskets, they also tend inherently to degrade the compression failure resistance of the gasket material and therefore reduce the ability of the gasket to withstand higher flange pressures. As a result, gaskets with specialized fillers to enhance sealability such as those disclosed in U.S. Pat. Nos. 5,240,766, 5,536,565 and 5,437,767 also can be severely limited in range of application.

It will thus be appreciated that for fibrous and perhaps other types of compressible gaskets, sealability and compression failure resistance have heretofore been mutually incompatible gasket properties. In other words, measures taken to enhance the sealability of such gaskets inherently tend to reduce compression failure resistance and vice versa. As a result, manufacturers of gaskets, and particularly fibrous gaskets, have engaged in proverbial balancing acts in order to design and produce gaskets with acceptable sealability and also acceptable compression failure resistance for a particular application. The problem, of course, is that each of these properties necessarily becomes a compromise and neither is optimized.

Another type of gasket used in many applications is known as a controlled compression rubber gasket. These types of gaskets incorporate molded rubber or polymer beads that are placed into a flanged joint in such a way that the amount of compression or compressive stress applied to the bead is predetermined and fixed by incompressible members. Such gaskets can take several forms. One form of a controlled compression rubber gasket is the common O-ring gasket, wherein a molded rubber bead is nested in a groove formed in the mating surface of one of a pair of flanges. The depth and width of the groove are carefully determined such that the compression stress on the rubber when the flanges are bolted together is known and thus controlled. In another form of controlled compression rubber gasket, a rubber bead or strip is molded onto the interior edge of a metal or plastic shim or carrier surrounding an interior aperture. The rubber bead is wider than the thickness of the shim and therefore can never be compressed to a thickness smaller then the thickness of the shim when the gasket is clamped between a pair of mating surfaces. Thus, the amount of compression applied to the rubber bead is limited by the thickness of the shim. In another example, a rubber bead is molded into grooves on one or both sides of a plastic carrier, which is disposed in a joint to be sealed. Metallic compression limiters, such as washers embedded in the carrier or shouldered bolts, provide a positive compression limit on the rubber and plastic of the gasket. Controlled compression rubber gaskets may also be found in the form of a rubber sheet or coating of a specific shape and profile molded onto both sides of a metal carrier with embedded washers or other means of compression limitation used to control the amount of compressive stress applied to the rubber coating.

U.S. Pat. No. 5,194,696 of Read illustrates one type of controlled compression rubber gasket wherein a rubber bead is molded onto the interior edge of a incompressible plastic carrier, the bead being wider than the thickness of the carrier. The gasket is placed between the mating flanges of a hard disc drive case and the flanges are bolted together until they engage the plastic carrier. The rubber bead is thus compressed between the flanges but never less than the thickness of the carrier such that the compressive stress applied to the bead is limited by the carrier thickness.

While the physical form of controlled compression gaskets varies, the sealing mechanism is common to all. Specifically, the beads of such gaskets are formed from a polymeric or rubber compound that is reasonably stable when in contact with heat and the particular fluid being contained. The spring rate of the compound in conjunction with the limited maximum compression stress provided by the carrier thickness or other compression limitation mechanism and the stiffness of the flanges yield a predetermined minimum and maximum surface stress between the rubber bead and the flange surfaces sufficient to prevent interfacial leakage. Spring rate of the bead is determined by the type and degree-of-cure of the rubber or polymer compound, the shape and contact area of the bead, and the thickness of the bead. The thickness of the compression limiter or depth of the groove in the case of O-ring seals is carefully designed to yield a compression stress on the bead that is sufficient to form a seal but not so high as to crush the bead. It will thus be seen that the performance of controlled compression gaskets is highly dependent upon the characteristics of the bead material and degree of compression provided by the compression limiting components. Too much compression can lead to crushing of the bead while too little can result in insufficient compression stress to establish a seal.

While controlled compression rubber gaskets have been used in many applications, they nevertheless suffer from a failure mechanism known as Compressive Stress Relaxation (CSR) failure in which the surface stress that prevents interfacial leakage diminishes over time. The CSR failure mechanism is a combination of several competing effects including, but not limited to, rearrangement of polymer molecule chains in response to the stress state, shrinkage of the bead due to molecular chain cross-linking, softening and swelling of the bead due to fluid penetration, and degradation of the polymer molecule chains due to heat, fluid, and oxygen exposure. Since the flange gap in which the bead resides is fixed by rigid compression limiters, these competing effects tend to reduce the compressive stress on the bead over time, which leads to leakage. Further, controlled compression gaskets tend to be substantially more expensive to manufacture than die-cut fibrous gaskets, which, among other factors, makes controlled compression gaskets an unacceptable alternative to fibrous gaskets in many applications.

A need therefore exists for an improved compressible fibrous gasket that retains the economy and wide application range of traditional fibrous gaskets and that also provides a superior and longer lasting seal. The properties of sealability and compression failure resistance should be de-coupled such that each can be optimized for a particular application without compromising the other. Such a gasket should exhibit excellent to complete sealability in a wide variety of joint types while at the same time having the highest possible resistance to compression failure where such failure is likely. The failure modes associated with controlled compression rubber gaskets should be successfully addressed, as should problems with warped or rough flange surfaces. A method of fabricating such a gasket that is economical, efficient, and reliable is also needed. It is to the provision of such a gasket and fabrication method that the present invention is primarily directed.

SUMMARY OF THE INVENTION

Briefly described, the present invention, in a preferred embodiment thereof, comprises an improved compressible fibrous gasket that exhibits simultaneously both excellent sealability in a wide range of joints and outstanding compression failure resistance. The gasket comprises a base sheet of substantially planar contiguous fibrous gasket material having a predetermined thickness and two opposed substantially parallel faces. The term "contiguous" as used herein means that the base sheet is uninterrupted across its flange width; that is, the gasket material of the base sheet extends continuously across the base sheet without breaks or innerlineations. This includes layered gaskets such as rubber coated metal gaskets wherein the layers are contiguous as defined herein. In general, the term "gasket material" as used herein when referring to the invention includes any appropriate porous and/or layered material or both, but is not intended to include rigid carriers such as the carriers of controlled compression rubber gaskets. Such carriers provide mechanical support and compression limitation for their rubber seals, but generally do not contribute to the gasketing or sealing functions of the gasket. The term "base sheet" when used alone without being identified as a base sheet of gasket material is intended to include rigid carriers and all other gasket materials.

The gasket material of the invention can be any of a number of traditional gasket sheet materials, but most preferably is a fibrous gasket material formed of a fiber and a binder and perhaps a filler. The base sheet has a flange width across its faces and is configured to define at least one interior aperture bounded by a substantially porous interior edge of the base sheet. In many instances, the aperture and interior edge are formed by a die-cutting process, which reveals the porous internal structure of the gasket material on the interior edge. A substantially porous exterior edge of the gasket extends around and defines the outside periphery of the base sheet.

An edge coating, which preferably is a polymeric coating, but that can be formulated of a latex or other suitable material, is disposed on the porous interior edge of the base sheet surrounding the gasket aperture. The material of the edge coating at least partially penetrates the exposed pores on the edge of the base sheet forming a relatively narrow intrusion zone surrounding the aperture. This intrusion zone seals the porous edge, anchors the edge coating to the base sheet, and densifies the material of the base sheet in the region immediately surrounding the aperture to concentrate available compressive stress in this region when the gasket is clamped between mating surfaces. The coating itself is formulated and configured to engage, conform to the shape of, and adhere to the mating surfaces to establish a significantly enhanced seal as compared to traditional fibrous gaskets.

The edge coating can take on any one of a variety of physical configurations according to the particular intended use of the gasket. In one and perhaps the most preferred embodiment, the edge coating is wider than the thickness of the base sheet so that the edge coating projects beyond the facial planes of the base sheet to define projecting rims that extend around the aperture of the gasket. In another embodiment, a relatively narrow face coating is provided on one or both faces of base sheet extending in a strip around the aperture. The face coatings may be formed of a different material than that of the edge coating with the face coating abutting the edge coating around the gasket aperture. Preferably, however, the edge coating surrounding the aperture is applied in such a way that it wraps around onto the faces of the base sheet to form the face coatings, in which case the edge and face coatings are made of the same material. In either event, it is important at least in regions of high compression stress to limit the width and thickness of the face coating strips as detailed below to minimize their detrimental effect on the compression failure resistance of the gasket.

A unique method of fabricating gaskets according to the present invention is also provided. Briefly described, the method, referred to herein as a "stack-and-coat" process, comprises stacking a predetermined number of cut gasket base sheets together with their apertures aligned with each other. The aligned apertures form a cavity having the outer contours of the aperture and a depth determined by the number of gaskets in the stack. According to one preferred methodology, the base sheets are stacked atop a plate having a shallow well formed therein, the well having a shape corresponding to the shape of the gasket aperture and being aligned with the apertures of the stacked gaskets. Coating material, such as a polymer, in liquid form is placed in the well and the cavity is closed off. The entire assembly is then tilted on edge and rotated at a predetermined relatively slow rate and through a predetermined number of revolutions. During rotation, the liquid polymer flows around the perimeter of the cavity and contacts the exposed edges of the stacked base sheets.

As the polymer flows around the perimeter of the cavity over and over again, it gradually builds up on the edges of the base sheets to form a coating on the walls of the cavity with a portion of the polymer penetrating into the porous gasket material of the edges to form intrusion zones. When a sufficient number of revolutions have been completed to build up a coating of a desired thickness, the assembly is tilted back down to allow excess polymer to drain back into the shallow well of the plate, whereupon the stack can be removed.

After allowing the polymer coating to thicken partially but not completely, the individual gaskets are peeled off of the stack.[1] Since the polymer is only partially thickened and thus still malleable, the peeling of each gasket causes the polymer on the gasket's edge to stretch and deform rather like soft taffy, which results in an edge coating that projects beyond the facial planes of the gasket to form the opposed projecting rims. The edge coatings are then fully thickened in an oven or otherwise to set the final shape and physical properties of the edge coating.

[1] The terms "thicken", "thicken", and term of similiar import are used herein to refer to the gradual transformation of the coating from its more liquid initial form to its more solid final form. "Partially thickened" means that the coating is in a state between the two forms in which retains a measure of malleability. Thickening can occur through a variety of physical and chemical mechanisms including curing (the cross-linking of polymer chains within the coating material) and drying (the evaporation of solvents fsroms the coating material). All such mechanisms are intended to be encompassed within the meaning of the term "thickened" as used herein.

In an alternative methodology referred to herein as a "mold-in-place" process, base sheets of gasket material are stacked with their apertures aligned as above but with one or more spacers disposed between the base sheets. The walls of the cavity formed by the stack are coated as described. The spacers have apertures that can be slightly smaller or slightly larger than the apertures of the base sheets. If a spacer with a slightly larger aperture is disposed between each base sheet, a narrow gap is formed between each sheet and polymer flows a slight distance onto the faces of each base sheet to form overlapped face coatings surrounding the apertures of the gaskets. Spacers with larger apertures produce edge coatings that do not project beyond the facial planes of the gasket. A precisely molded wrapped edge coating can be formed by stacking a larger aperture, then a smaller aperture, then another larger aperture spacer between each of the base sheets of gasket material. In either event, edge and face coatings are formed on the gaskets.

Alternative methodologies for coating the interior edges of the stacked base sheets are also envisioned and form part of the invention. These alternative methodologies include a "stack-and-fill" process wherein the base sheets are stacked and the cavity formed by their aligned apertures is filled with a polymeric coating material. After a predetermined time, the coating material is drained or poured out of the cavity, leaving a coating on the interior edges of the gaskets. Other methodologies include a "stack-and-spray" process wherein the coating material is sprayed onto the interior edges of the stacked base sheets, and a "stack-and-wipe" process wherein the coating material is wiped or spread onto the interior edges with a squeegee or other appropriate tool. These and other methodologies are encompassed by the stack-and-coat process of the present invention.

Edge coated compressible gaskets according to the present invention provide outstanding sealability and eliminate the failure modes of traditional gaskets in at least the following ways. Application of a polymer edge to a compressible base sheet yields a complex sealing mechanism that maximizes tolerance to flange surface imperfections (roughness, warping, and deflection) and creates a tight fluid seal with a minimum of clamp load. This is accomplished through selection of a relatively soft conformable polymer for the edge coating that, when applied to form protruding rims relative to the faces of the base sheet, is highly conformable to flange surface imperfections. As the polymer edge is compressed to near the thickness of the base sheet, the attachment of the polymer edge to the base sheet provides a significant stiffening effect, which dramatically increases the spring rate of the edge in compression. This allows significant sealing force to be generated in the polymer edge while using a soft conformable polymer that is able to accommodate significant compression strain.

Further, the intrusion zone created by migration of the polymer into the edge pores of the base sheet creates a band of higher density around the gasket aperture, which serves to concentrate compressive load where it is most needed to enhance the seal.

Additional factors also contribute to the outstanding performance of gaskets of this invention. These include the use of a polymer that is impervious to the fluid to be sealed, which prevents intersticial leakage. The conforming of the edge coating to flange surface imperfections, the development of sealing stress through compression of the edge coating and the intrusion zone, and the selection of polymers that develop surface adhesion to the flange surfaces all contribute to an outstanding seal against interfacial leakage. The combination of the sealing mechanisms of compression stress and surface adhesion results in a seal that, over time, is more tolerant to degradation of either or both. For instance, in the event that compression stress of the polymer edge coating drops over time to a level below that needed to create an initial seal given the flange condition, fluid type, and fluid pressure, a leak still will not occur because an adhesive bond has developed between the material of the edge coating and the flange surfaces.

Application of a polymer edge coating to a compressible base sheet according to the present invention also successfully addresses the problem of compression stress relaxation failure common in controlled compression rubber gaskets. Specifically, the compressible nature of the base sheet material results in a natural thinning of the base sheet over time due to compression stress. This thinning causes the flange surfaces to move slightly closer together over time, which actually increases the compressive stress on the polymer edge coating. This increase in compressive stress, which cannot occur with controlled compression gaskets, usually is more than sufficient to offset any stress relaxation that may be experienced by the polymer edge coating.

Embodiments of the present invention with face coating strips address compression stress relaxation through an additional mechanism. Compression stress on the bead of a traditional controlled compression gasket usually ranges from about 100 to 1000 pounds per square inch (psi). Compression stress relaxation can cause a loss of from 60 to near 100 percent of the initial sealing stress on the bead, often resulting in insufficient compression stress to maintain a seal. However, in the face coated embodiments of the present invention, initial sealing stress on the coating material can range from 1,000 to 10,000 psi. Provided that a polymeric material is selected that can accommodate such levels of stress, a loss of even 90 percent of the initial sealing stress still does not reduce remaining sealing stress below the level necessary to maintain the seal. Thus, stress relaxation failure modes of traditional prior art gaskets are virtually eliminated by edge coated gaskets of the present invention.

It will be appreciated from the forgoing that a unique and improved gasket is now provided that addresses and solves the long-standing problems with prior art gaskets. The gasket of the present invention, because of its uniquely configured high sealability edge coating, provides a seal around the aperture of the gasket that is outstanding and, in many cases, near perfect. At the same time, since the edge coating provides such an exceptional seal, the base sheet or flange portion of the gasket requires little or no coating or impregnation to enhance its sealability. As a result, the maximum compression failure resistance providable by the fibrous gasket material of the base sheet is preserved.

Traditional failure modes of the edge coating itself, such as stress relaxation failure, are also virtually eliminated through the complex sealing mechanisms and edge coating configurations of the invention. The ultimate result is a highly reliable long lasting gasket that exhibits exceptional sealability and outstanding compression failure resistance simultaneously. In addition, the edge coating material itself can be specifically formulated for the particular use to be made of the gasket. For example, water pump gaskets can be provided with an edge coating that is particularly resistant to water/anti-freeze mixtures whereas the edge coatings on oil cooler gaskets can be formulated to seal against petroleum based oils. Finally, the physical configuration of the edge coating can be tailored for the particular joint type to be sealed. For instance, thicker wider edge coatings may be called for where the gasket is to be used with rough or warped flange surfaces or with thin flanges where compression stress can vary greatly due to flange deformation. On the other hand, thin narrow edge coatings may be chosen to seal flat smooth flange surfaces or highly stressed joints.

While the combination of excellent sealability and preserved compression failure resistance is a particularly advantageous property of the present invention, it will be appreciated that the edge coating of the invention provides unique advantages independent of compression failure resistance. For instance, compression failure resistance is not always a concern or a design specification, especially when sealing joints that are not highly stressed. In these situations, the edge coated gasket of this invention still provides enhanced sealability independent of whether or not compression failure resistance is preserved. Thus, the invention should not be deemed to be limited to the combination of these features, although each may be present in many of the preferred embodiments disclosed herein. These and many other features, objects, and advantages of the gasket and method of the present invention will become more apparent upon review of the detailed description set forth below when taken in conjunction with the accompanying drawing figures, which are briefly described as follows.

DESCRIPTION OF THE PREFERRED EMBODIMENTS

Figure 21:
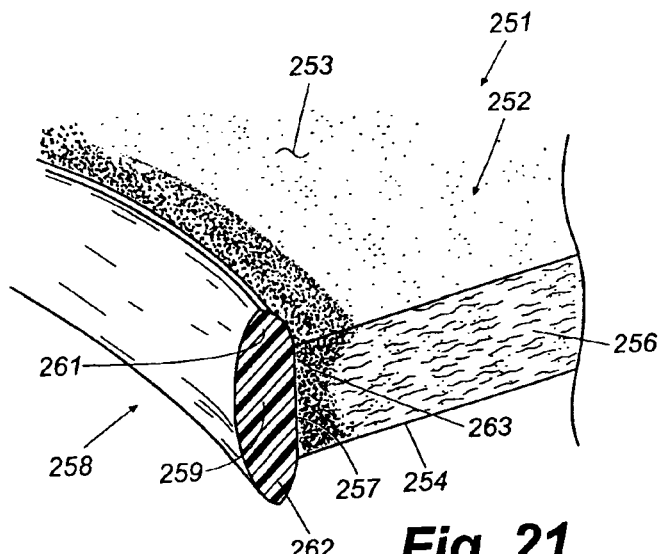
FIG. 21 is a perspective partially sectioned view of an edge coated gasket configuration that represents a best mode of carrying out the invention.
Figure 22:
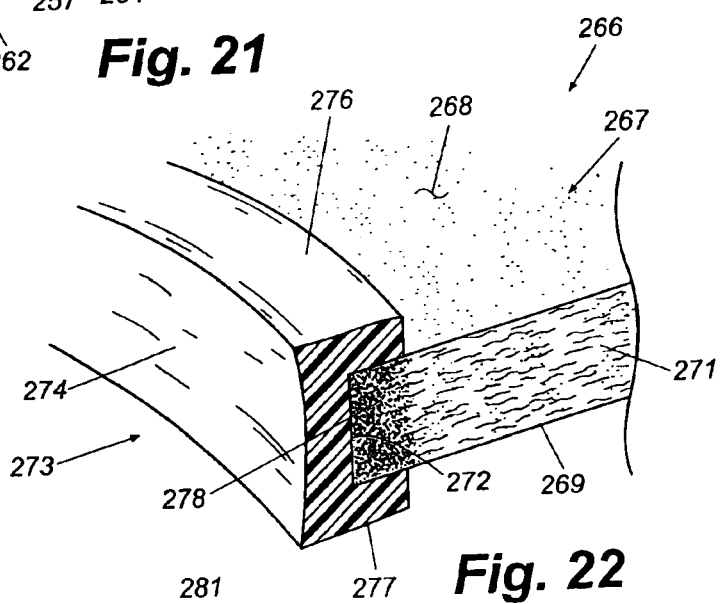
FIG. 22 is a perspective partially sectioned view of an edge wrapped gasket configuration that represents a best mode of carrying out the invention.
Figure 23:
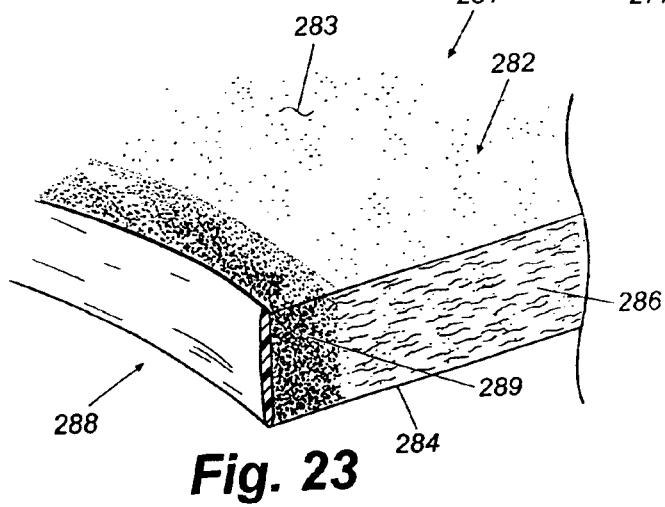
FIG. 23 is a perspective partially sectioned view of an edge coated gasket configuration that represents yet another best mode of carrying out the invention.

Reference will now be made to the attached drawing figures, wherein like reference numbers refer where appropriate to like parts throughout the several views. FIGS. 1 through 17 illustrate some of the wide variety of edge coated gasket configurations encompassed by the present invention. While many of the design parameters in these illustrations are dictated by similar application considerations and are thus the same, the various edge coating profiles illustrated in FIGS. 1 through 17 may each be useful in particular application specific conditions. As described in more detail below, FIGS. 21–23 illustrate edge coated gasket configurations that have been found to be commercially viable and that represent best mode of carrying out the invention.

Figure 1:
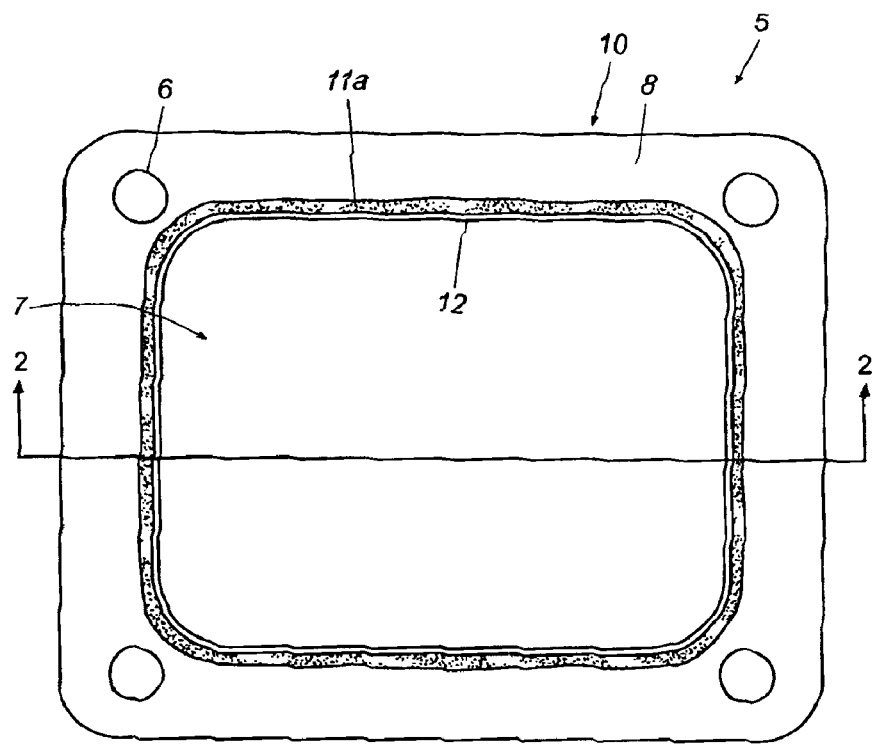
FIG. 1 is a top plan view of a gasket that embodies principles of the present invention in one preferred form.
Figure 2:
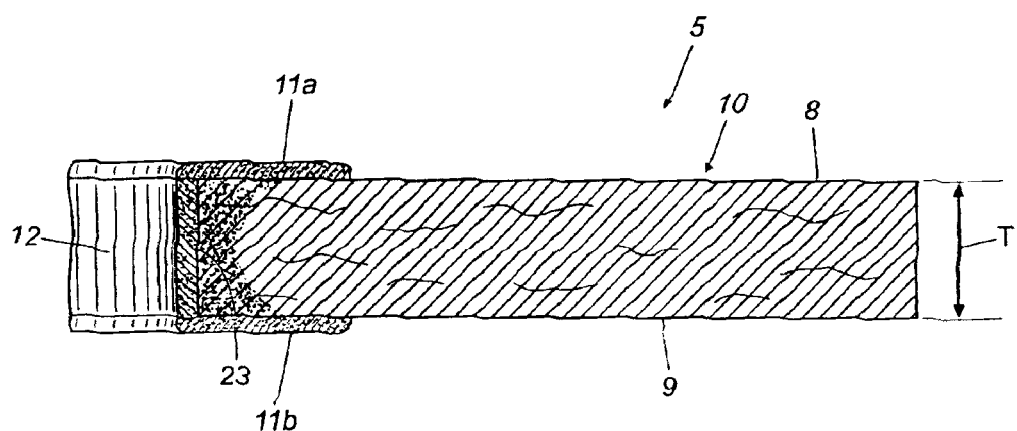
FIG. 2 is a cross-sectional view of the gasket of FIG. 1 taken along line 2—2 thereof.

FIGS. 1 and 2 illustrate a generally rectangular gasket that embodies principles of the invention in one preferred form. While a simple rectangular gasket is illustrated for clarity of description in this and other figures, it will be appreciated that gaskets can and do take on any of a large number of configurations depending on the particular intended use of the gasket. Further, while a gasket with a single aperture is illustrated in the preferred embodiments, many real world gaskets are configured with two or more apertures and each aperture may seal against a different type of fluid. The present invention is applicable to any or all of the apertures of such gaskets.

The gasket 5 comprises a base sheet 10 of relatively planar gasket material, which preferably is a compressible fibrous gasket material. The base sheet 10 has a flange width measured between its interior and exterior edges and is substantially contiguous, i.e. unbroken, across its flange width. The base sheet 10 has a thickness T and two opposed substantially parallel faces 8 and 9, which lie in respective spaced-apart facial planes. Bolt holes 6 are formed in the respective four corners of the base sheet for accommodating bolts that attach surrounding flanges or mating surfaces together and that are tightened to compress the gasket 5 between the mating surfaces to create a seal.

The base sheet 10 has a fibrous internal structure and is configured, usually by a die cutting process, to define an interior aperture 7 surrounded by a somewhat porous interior edge 23 of the base sheet. An exterior edge 20 extends around the outside perimeter of the base sheet 10 and usually, but not necessarily, is porous as well. The porous nature of the interior and exterior edges of the base sheet result from the less than fully dense gasket material and the fact that the fibrous internal structure is exposed on the edges. Base sheets with porous interior edges also may be formed of other gasket materials including foam, cork, and rubber and all such materials are encompassed within the present invention.

The base sheet 10 may be fabricated from any known suitable gasket material that is appropriately compressible, flexible, and preferably, but not necessarily, fibrous and porous. Examples of suitable gasket materials include sheet gasket materials formed from a fiber and a binder or a fiber, a binder, and a filler. The present invention is also applicable to composite gasket material, sometimes known as "on core" gasket material, which is formed with a first or core material sandwiched between second or facing materials. Some specific gasket material compositions suitable for use with the present invention are discussed in greater detail below. The preferred embodiments are described herein in terms of a fibrous gasket material that is flexible, compressible, and porous and that exhibits good inherent compression failure resistance. The invention is particularly suited for use with such gasket materials.

An edge coating 12 is disposed on the interior edge 23 of the base sheet 10 and extends around the aperture 7. The edge coating preferably is formed of a polymer-based material that is selected or formulated to be resistant to chemical attack or degradation by the particular fluid that is to be sealed by the gasket, to be substantially impervious to such fluid, and to form an exceptional seal when compressed between a pair of metal flanges or mating surfaces. The edge coating 12 has a thickness measured in a direction parallel to the facial planes of the base sheet 10 and a width measured in a direction substantially transverse to the facial planes. In FIGS. 1 and 2, the thickness of the edge coating 12 is substantially the same across its width and the width of the edge coating is substantially the same as the thickness T of the base sheet 10. Other configurations of edge coatings are also possible and contemplated as described in more detail below.

As illustrated at 26 in FIG. 2, the polymeric material of the edge coating 12 intrudes a short distance into and fills the exposed pores that characterize the interior edge 23 of the base sheet 10 forming an intrusion zone. This intersticial intrusion of the edge coating material into the porous edge provides a number of beneficial functions. For example, the intrusion anchors the edge coating 12 securely to the interior edge 23 of the base sheet 10 so that the edge coating becomes an integral and unitary part of the gasket and will not separate from the edge over time, as can occur with molded rubber edge gaskets. The intrusion of the edge coating also functions to seal off the exposed pores on the interior edge of the base sheet to inhibit intersticial seepage of fluid through the gasket. Finally, the effective density of the base sheet 10 is raised somewhat in the intrusion zone of the intruding polymer. It has been found that this densification tends to concentrate available compressive stress in the region of the intrusion zone when the gasket is compressed between a pair of flange surfaces, which enhances the seal provided by the gasket. In other words, the intrusion zone enhances the ability of the gasket to create and continue to provide a seal beyond the time when compressive stress on other areas of the gasket may fall below that needed to maintain the seal.

The gasket 5 of FIGS. 1 and 2 is also provided with face coatings 11a and coating 11b on respective faces 8 and 9 of the base sheet 10. Face coatings 11a and 11b each extend around the aperture 7 of the gasket in a relatively narrow strip having a thickness and a width. As discussed in some detail above, the application of such a coating on a face or faces of the base sheet tends inherently to reduce the compression failure resistance of the base sheet. However, by carefully selecting the thickness and the width of the face coatings 11a and 11b, the detrimental effects of the face coatings can be substantially minimized. More specifically, it has been found that the width of the face coatings 11a and 11b may be from about 5 mils (one mil is one one-thousandth of an inch) to about 0.6 inches (depending on the size, configuration, and intended use of the gasket) so long as the face coating covers less than about 50% and preferably less than about 30% of the facial area of the base sheet. The face coatings may not even appear in the most highly loaded areas of the gasket. It has also been found that the thickness of the face coatings preferably should be less than about 11 mils in order to minimize detrimental effects on compression failure resistance. Of course, these limitations are important only in regions of the gasket where compression failure resistance is required, such as in the vicinity of the bolt holes where compressive force can be very high. In regions where compressive force is low, such as in the mid-span of the bolts, compression failure resistance is not as critical a concern and face coatings with widths and thicknesses outside the preferred ranges recited above may be used safely. Coatings 11a and 11b are illustrated in FIGS. 1 and 2 as being formed of a different material than edge coating 12; however this should not be considered to be a limitation of the invention.

In use, the face coatings 11a and 11b engage and seal against opposed flange surfaces between which the gasket is compressed. Under these conditions, the edge coating seals against intersticial leakage of the service fluid and the face coatings seal against interfacial leakage. The characteristics of the polymer materials from which the coatings are formed thus result in a near perfect to perfect seal around the aperture of the gasket. This seal is accomplished through a number of fundamental mechanisms, which are discussed in some detail above. First, when the gasket is compressed between two flange surfaces, the face coatings tend to fill any imperfections such as scratches or roughness in the mating surfaces that otherwise might result in leakage. Second, the face coatings and to some extent the rims of the edge coating, which are the portions of the edge coating that protrude beyond the facial planes of the base sheet, tends to conform to any waviness or deviations from flatness in the mating surfaces that might occur, for example, with slightly warped flanges or with thin flanges that can deflect significantly between bolt holes. Finally, the polymeric material of the edge coating is formulated to have a certain inherent tackiness that causes it to adhere to and form a bond with the flange surfaces between which the gasket is clamped. The amount of tackiness can be controlled by judicious formulation or selection of coating materials to suit a particular application. Tackiness can also be provided if desired through a layer of coating of a tacky polymer deposited on an edge coating having otherwise desirable properties.

The edge and face coating material is selected to be impervious to and substantially chemically non-reactive with the particular fluid that must be sealed. Accordingly, these coatings essentially function as a dam around the aperture 7 of the gasket to prevent both interfacial and intersticial leakage. An exceptional and in many cases a perfect seal is thus formed, even under less than perfect conditions. Further, as discussed in some detail above, the complex sealing mechanism formed by the compressible base sheet and polymer edge and face coatings successfully addresses stress relaxation failure and other problems with prior art controlled compression type gaskets.

Figure 3:
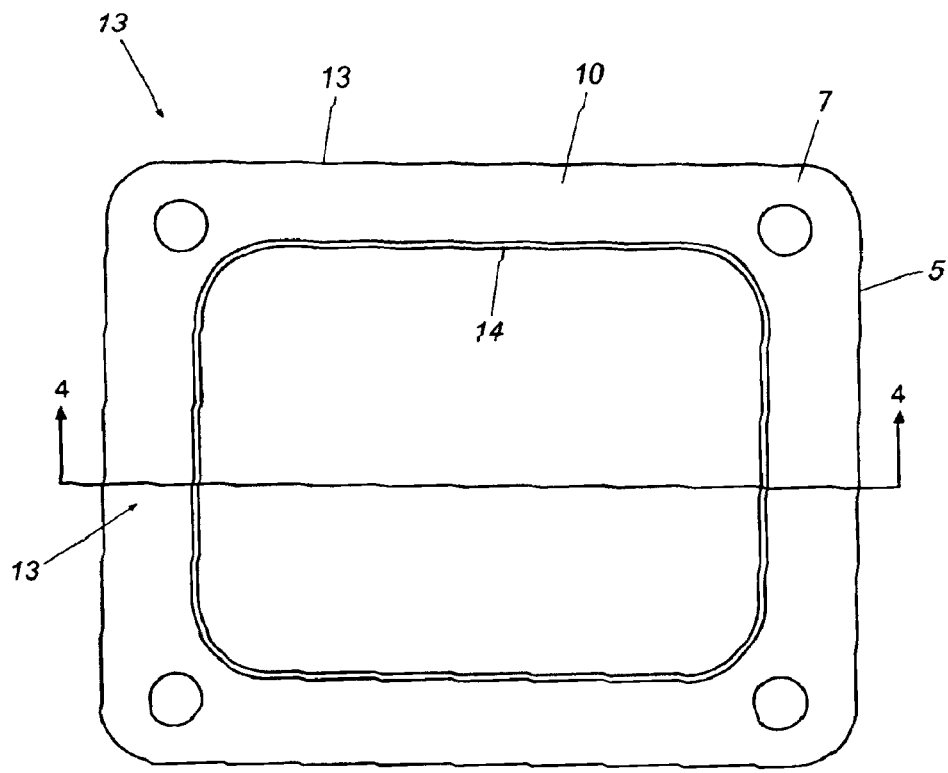
FIG. 3 is a top plan view of a gasket that embodies principles of the present invention in an alternate preferred form.
Figure 4:
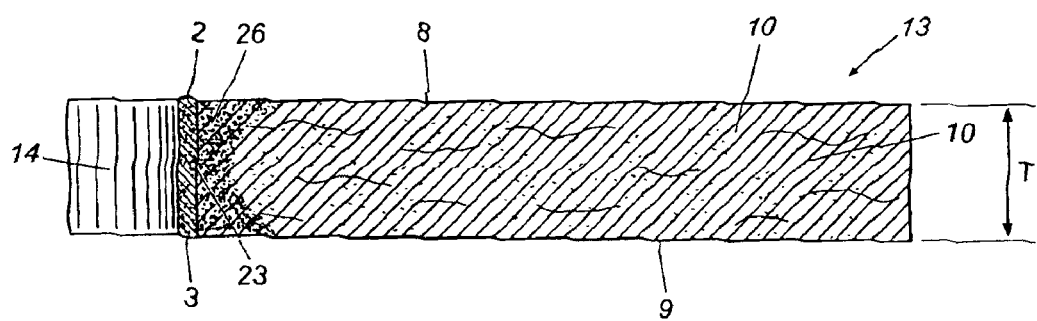
FIG. 4 is a cross-sectional view of the gasket of FIG. 3 taken along line 4—4 thereof.

FIGS. 3 and 4 illustrate an alternate embodiment of an edge coated gasket according to the present invention. The gasket 13, which again is illustrated as a simple rectangular gasket for clarity of description, comprises a base sheet 10 having opposed substantially parallel faces 8 and 9, which lie in respective facial planes. The base sheet 10 preferably is formed of a substantially planar contiguous gasket material that is compressible and preferably porous. While any appropriate compressible gasket material may be used, a fibrous gasket material formed of a fiber, a binder, and perhaps a filler is preferred. The base sheet 10 is die-cut or otherwise formed to define an interior aperture 7 bounded by a substantially porous interior edge 23 of the base sheet. An exterior edge 5 extends around the perimeter of the base sheet 10 and the base sheet has a flange width as measured between its interior edge 23 and its exterior edge 5. Bolt holes are provided to accommodate bolts that compress the gasket between flange surfaces to seal the joint therebetween.

An edge coating 14, which preferably is formed from a selected polymeric material, is disposed on the interior edge 23 of the base sheet 10. The edge coating has a thickness in a direction parallel to the facial planes of the base sheet 10 and a width measured in a direction transverse to the facial planes. The width of the face coating extends between respective rims 2 and 3 thereof. As seen in FIG. 4, the rims 2 and 3 of the edge coating or protrude just slightly beyond respective facial planes of the base sheet 10. The polymeric material of the edge coating penetrates or intrudes into the porous interior edge 23 of the base sheet to form an intrusion zone 26, which extend around the aperture of the gasket. As in other embodiments, the intrusion zone anchors the edge coating securely to the edge of the base sheet, seals the pours on the interior edge 23, and densifies the gasket material in the region of the intrusion zone.

It will be appreciated that the embodiment of FIGS. 3 and 4 has a polymer edge coating but has no portion of the faces 8 and 9 covered with a face coating as in the embodiment of FIGS. 1 and 2. Accordingly, while the face coatings of FIGS. 1 and 2 may cover up to about 50% of their respective faces, the gasket of FIGS. 3 and 4 has 0% of its faces coated with face coatings. Thus, it may be said that the face coatings according to the present invention may cover from 0% to about 50% of the base sheet 10.

Since no face coating is provided in the embodiment of FIGS. 3 and 4, the inherently high compression failure resistance of the unaffected gasket material of the base sheet is preserved. Thus, the gasket of FIGS. 2 and 3 functions well under conditions of higher flange pressures where compression failure resistance is required. At the same time, the edge coating 14 seals exceptionally well around the interior edge 23 of the base sheet to prevent intersticial leakage. The rims 2 and 3 of the edge coating engage, conform to, and seal against the flange surfaces between which the gasket is compressed. The embodiment of FIGS. 3 and 4 have rims that protrude only a short distance beyond the facial planes, which is preferred for stiff smooth flanges and highly stressed joints. As discussed below, larger protruding rims of various configurations may be preferred for sealing lower quality joints. The intrusion zone 26 increases the effective material density in the region of the base sheet surrounding the aperture. Thus, clamping load is concentrated and higher average flange pressures are maintained in this region. Thus, as discussed above relative to the embodiment of FIGS. 1 and 2, even if compression stress relaxation or flange warp should cause flange pressures to fall below acceptable levels in other areas of the base sheet, the flange pressure can be maintained at or above acceptable levels in the critical region surrounding the aperture of the gasket because of the densified intrusion zone. The ultimate result is that a gasket formed according to the embodiment of FIGS. 2 and 3 maintains sealability and substantially enhanced compression failure resistance under degraded flange pressure conditions.

FIGS. 5–18 illustrate a variety of alternative profiles for edge coatings in accordance with the present invention. Each of these figures is a cross-sectional view of a gasket and each shows an edge coating formed on a base sheet of compressible gasket material, preferably a fibrous gasket material (referenced by numeral 10 in the figures). Each base sheet has opposed faces 8 and 9 that lie in respective facial planes 29 and 30. A porous interior edge 23 bounds and defines an internal aperture of the gasket. Further, in each figure the edge coating is shown penetrating and intruding into the porous edge 23 of the base sheet to form an intrusion zone 26. The edge coating in each case preferably is formed of a polymeric material that is selected for appropriate spring rate, tackiness, and resistance to deterioration by the particular fluid to be sealed by the gasket. It will be appreciated that materials other than polymer may be used if desired.

Figure 5:
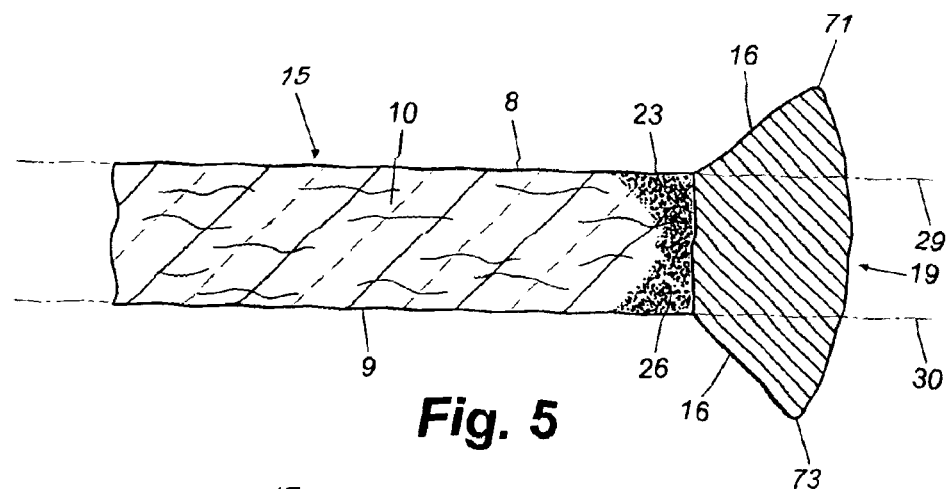
FIGS. 5–17 are cross-sectional views illustrating various configurations of gasket edge coatings that embody principles of the present invention.

FIG. 5 illustrates an edge coating 19 formed on the interior edge a base sheet 15. In this embodiment, no face coatings are provided and, accordingly, the gasket retains maximum compression failure resistance. The edge coating 19 has an inwardly rounded convex interior face and beyond the facial planes 29 and 30 of the base sheet to protruding rims 71 and 73 that extend around the aperture of the gasket. Edge coating is thus thicker in its central region than around its rims 71 and 73. Although many dimensions may be acceptable depending upon a particular intended application for the gasket, it has been found that the rims 71 and 73 of the edge coating may protrude beyond the facial planes 29 and 30 a distance of from about 1 mil to about 40 mils (one mil is one one-thousandth of an inch) depending on the size and configuration of the gasket and its intended application to obtain superior sealability around the aperture of the gasket.

Figure 6:
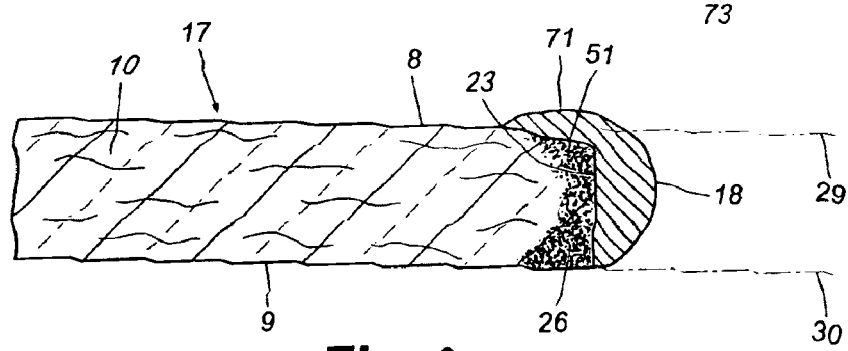

FIG. 6 illustrates an edge coated gasket with an depressed region 51 of the face 8 surrounding the aperture of the gasket. The depressed region 51 is configured as a relatively narrow strip surrounding the aperture and reduces the width of the interior edge of the base sheet to a width less than the thickness of the base sheet. The depressed region 51 may be formed intentionally through embossing techniques or may simply be an artifact of the die-cutting process. The edge coating 18 in this embodiment is generally bulbous in shape and wraps around to cover the depressed region 51 of the gasket face 8. A portion 71 of the edge coating 18 protrudes beyond the facial plane 29 of the face 8 to form a protruding rim 71 surrounding the aperture of the gasket on one side thereof. The protruding rim 71 generally overlies the depressed region 51, although this is not necessarily a requirement. The protruding portion 71 provides extra sealability upon contact with an adjacent flange when the gasket is compressed between two flanges or other mating surfaces. The protruding portion may extend from about 1 to about 40 mils beyond the facial plane 29 depending upon the size, configuration, and intended application of the gasket.

An edge coating with the configuration shown in FIG. 6 may be formed by the stack-and-coat methodology described briefly above and in more detail below. In such a process, the recessed regions 51 of stacked gaskets form voids into which coating material flows. When the individual gaskets are separated, a face coating extending over the depressed region is formed. The final shape and size of this face coating can be controlled to a large extent by judicial selection of the coating rheology and the length time before the gaskets are separated. A softer more rounded coating as shown in FIG. 6, for example, is formed when the coating material is softer and more malleable when individual gaskets are separated from the stack.

Figure 7:
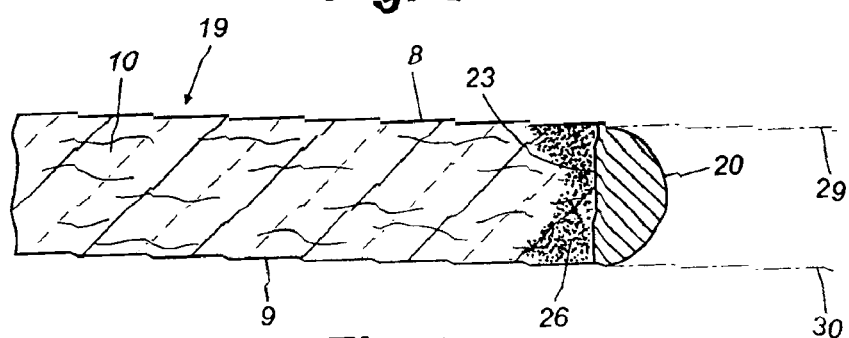

FIG. 7 illustrates an edge coated gasket in which the edge coating 20 is applied only to the interior edge of a base sheet 19. The edge coating 20 is seen to be generally bulbous or semi-circular in shape, and is substantially thicker in its central portion than at its edges. In this embodiment, the edge coating 20 has a width that is substantially the same as the thickness of the base sheet 19 so that the rims of the edge coating lie substantially in and do not protrude beyond the facial planes 29 and 30. When the gasket of FIG. 7 is clamped between mating surfaces, the edge coating seals against intersticial leakage and is slightly compressed along with the base sheet such that a relatively broad area of the edge coating engages the flanges to seal against interfacial leakage. However, since there are no protruding rims in the embodiment of FIG. 7, the edge coating does not tend to conform well to flange surface imperfections and roughness. Accordingly, a gasket according to FIG. 7 may be preferred for use with rigid, smooth, flat flange surfaces.

Figure 8:
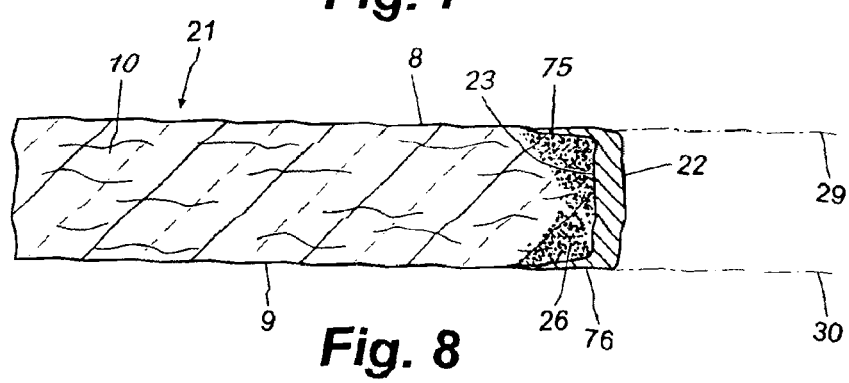

FIG. 8 illustrates a gasket with a base sheet 21 that has depressed regions 75 and 76 on both faces 8 and 9 in relatively narrow strips surrounding the aperture of the gasket. The depressed regions 75 and 76, which may be formed by embossing techniques, form a tapered strip around the aperture of the gasket and result in an interior edge 23 having a width less than the thickness of the base sheet 21. The edge coating 22 is disposed on the edge 23 and also wraps around onto and substantially covers the depressed regions 75 and 76 of the base sheet. Further, in the illustrated embodiment, the wrapped portions of the edge coating protrude slightly beyond the facial planes 29 and 30 in which the faces of the base sheet lie, although the wrapped portions might also lie substantially in and not protrude beyond the facial planes.

When the gasket of FIG. 8 is clamped between a pair of flanges or mating surfaces, the wrapped portions of the edge coating engage the surfaces of the flanges with a relatively large area of contact. The depressed regions 75 and 76 of the base sheet beneath the wrapped portions of the edge coating provide small cavities or recesses into which the material of the wrapped portions can be squeezed and compressed. This tends to concentrate the available flange load in the depressed regions. Further, the wrapped portions of the edge coating conform to rough and warped regions of the flange surfaces to seal these imperfections. The overall result of the large area of contact and concentrated flange pressures is an enhanced seal around the aperture of the gasket while maintaining the superior compression failure resistance provided by the material of the base sheet 21.

Figure 9:
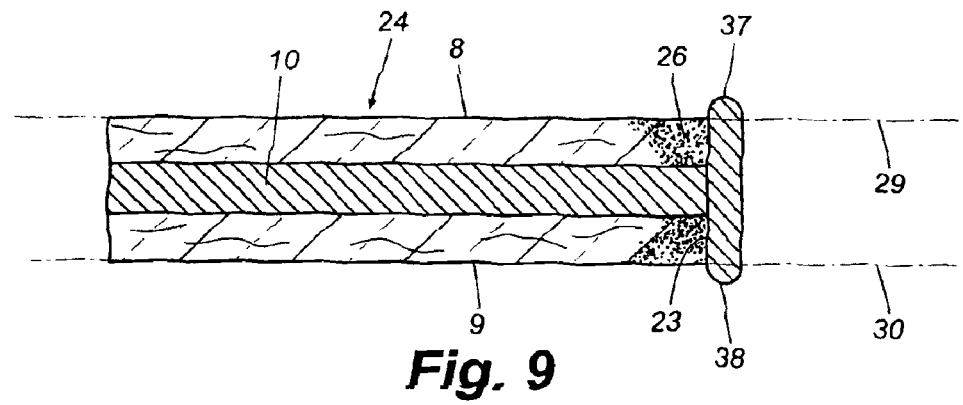

FIG. 9 illustrates an edge coated gasket in which the edge coating is applied only to the edge of the base sheet 24 and is configured with a thickness that is substantially uniform throughout the width of the coating. The base sheet 24 in FIG. 9 is configured as a layered gasket material with a core 10 covered by layers of sheet material. A rubber coated metal gasket is an example of such a layered configuration, and the present invention is applicable to and includes edge coatings on layered base sheets. The ends of the edge coating protrude beyond the facial planes 29 and 30 of the base sheet to form a pair of protruding rims 37 and 38 that surround the aperture of the gasket and its intended application. The rims may protrude beyond the facial planes from about 1 to about 40 mils depending upon the configuration and size of the gasket. When clamped between a pair of mating surfaces, the protruding rims 37 and 38 of the edge coating are engaged and compressed by the mating surfaces before the mating surfaces engage and begin to compress the base sheet 24 of the gasket. As a result, the rims tend to fill in and seal imperfections such as scratches or indentations that may exist in the mating surfaces. Further, in situations where the mating surfaces may be slightly warped or otherwise vary from a flat configuration, the lips 37 and 38 of the edge coating conform to the shape of the mating surfaces, thereby accomplishing a seal against interfacial leakage of fluid, even under these less than ideal conditions. The portion of the edge coating covering the edge of the gasket seals against intersticial leakage. As a result, a very good if not total seal can be achieved even with flange surfaces that are rough or warped or that deflect when clamped due to the thinness of the material from which they are made. However, since there are no face coatings, compression failure resistance of the gasket is preserved. Accordingly, the edge coated gasket of FIG. 9 may be selected for highly stressed joints that are not perfectly flat or smooth.

Figure 10:
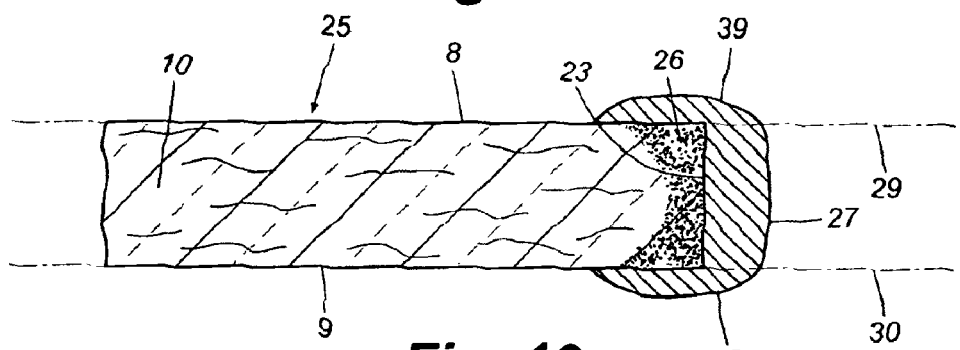

FIG. 10 illustrates a gasket with an edge coating that wraps around onto the faces of the base sheet to form face coatings extending in relatively narrow strips around the aperture of the gasket. The edge coating 27 is slightly bulbous in its mid portion and each of the wrapped face coatings has a width measured in a direction parallel to its respective facial plane, and has a thickness. The thickness of each face coating should be carefully selected to minimize any detrimental effect on the overall compression failure resistance of the gasket. It has been found that a thickness of the face coating in the range of from about 1 mil to about 11 mils forms a good seal without significantly degrading the compression failure resistance in regions of the gasket where compression failure resistance is a concern. In other regions, such as in the mid-span between bolt holes, the thickness of the face coating may range up to about 50 mils if desired. The width of the face coatings may be from about 5 mils to about 0.6 inches depending on the size and intended application of the gasket. In any event, each face coating should cover no more than about 50 percent of its respective face and more preferably no more than about 30 percent, especially in regions of the gasket where compression failure resistance is of greatest concern.

The somewhat rounded contours of the edge coating in FIG. 10 may be obtained by appropriate selection of coating rheology and dwell time before separating individual gaskets from the stack in a stack-and-coat process. Use of a coating material such as latex or a 100 percent solid polymer, which tend to relax more after separation, can also result in softer contours such as those illustrated in FIG. 10.

When the gasket of FIG. 10 is compressed between a pair of flanges, the face coatings engage and conform to the shape of the flange surfaces and adhere to the surfaces according to the tackiness of the material to form a seal against interfacial leakage. As with other embodiments, the edge coating seals the intersticial pores of the interior edge and is sufficiently impervious and chemically non-reactive with the fluid being sealed to prevent intersticial leakage. In addition, the intrusion zone 26 in conjunction with the face coatings tends to concentrate available compression stress in a narrow strip around the aperture of the gasket. Finally, depending upon the clamping conditions, the initial compression stress applied to the face coatings can be very large such that even if substantial compression stress is lost due to stress relaxation, sufficient compression stress remains to maintain a seal. The result is an excellent to perfect seal under a wide variety of flange conditions and compression stresses.

Figure 11:
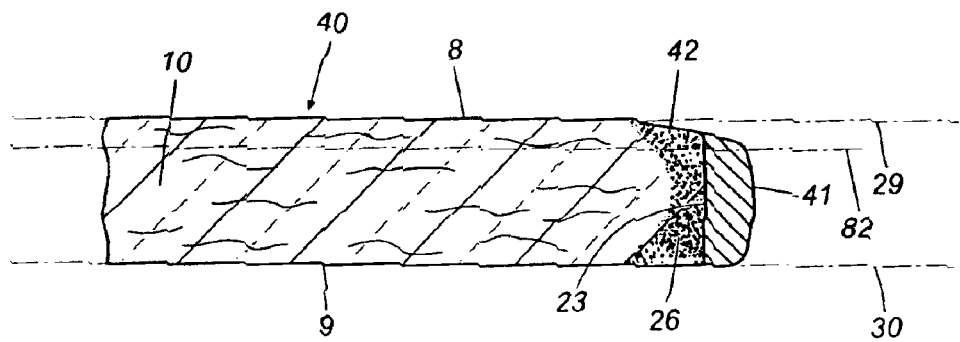

FIG. 11 illustrates another embodiment that is similar to the embodiment of FIG. 6 in that one of the faces of the base sheet, face 8 in the illustration, has a depressed region 42 that extends in a relatively narrow strip around the aperture of the gasket. The depressed region 42 should be less than about 0.5 inches in width. The faces 8 and 9 of the base sheet lie in respective facial planes 29 and 30 and the interior edge 23 of the base sheet meets the interior edge of the depressed region 42 substantially in a corner plane 82, which is intermediate facial planes 29 and 30. The edge coating 41 is applied to the interior edge 23 of the base sheet and has a width that extends from the facial plane 30 of the base sheet to a position just beyond the corner plane 82. However, in contrast to the embodiment of FIG. 6, the edge coating 41 does not extend beyond or even to the facial plane 29 and thus does not form a face coating or a projecting rim around the aperture of the gasket. An intrusion zone 26 is formed by the intrusion of edge coating material into the porous edge 23 of the base sheet.

Figure 12:
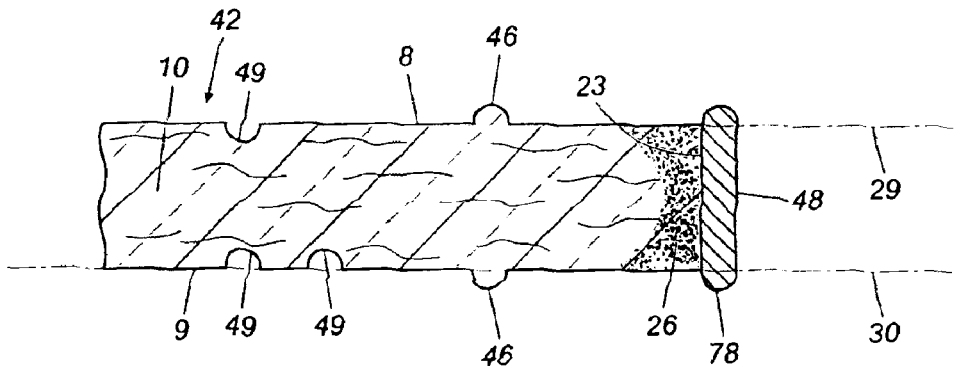

FIG. 12 illustrates another embodiment of an edge coated gasket that embodies principles of the invention. This embodiment is similar in many respects to the embodiment of FIG. 9, except that the edge coating 48 protrudes only beyond one of the facial planes, facial plane 30, to form a single protruding rim 78 around one side of the gasket's aperture. The base sheet 42 is provided with raised beads 46, which extend around base sheet a predetermined distance from the interior edge 23 thereof. Raised beads are sometimes formed in gaskets to concentrate load in the beaded regions to enhance the seal provided by the gasket. FIG. 12 is included to illustrate that the edge coating of the present invention is applicable to beaded as well as non-beaded gasket base sheets. Indentations 49 are also formed in and extend around the base sheet 42 at a predetermined distance from the outer edge of the base sheet. The bead 46 and indentations 49 typically are formed in the material of the base sheet by embossing techniques, although other techniques may also be used.

Figure 13:
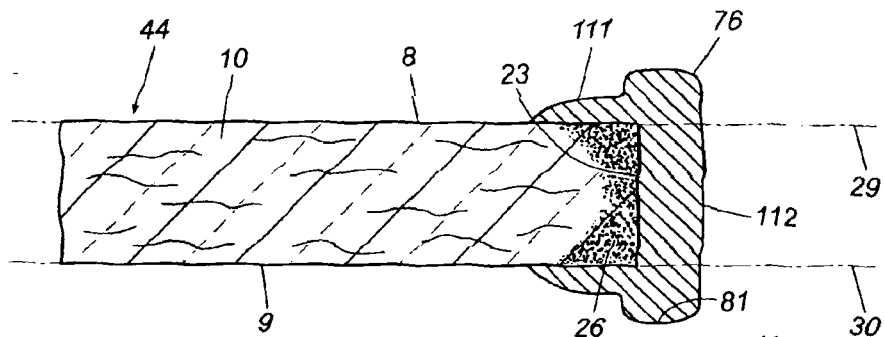

FIG. 13 illustrates yet another embodiment of the invention wherein a gasket base sheet 44 is provided with a uniquely configured edge coating 112. As in the embodiment of FIG. 10, the edge coating 112 in FIG. 13 wraps around onto the faces 8 and 9 of the base sheet to form face coatings 111 that extend in relatively narrow strips around the aperture of the gasket. The face coatings 111 have a thickness in regions where compression failure resistance is required that preferably is less than about 11 mils and a width that covers less than 50 percent and preferably less than 30 percent of the faces of the base sheet 44. Unlike the embodiment of FIG. 10, however, the edge coating 112 in this embodiment protrudes beyond the facial planes 29 and 30 and also protrudes beyond the face coatings 111 to form protruding rims 71 and 81 around the aperture of the gasket. Preferably, the rims 76 and 81 protrude beyond the face coatings 111 a distance of from about 1 to about 40 mils, although other degrees of protrusion may be selected depending on the size and intended application of the gasket.

As the gasket of FIG. 13 is compressed between a pair flanges, the surfaces of the flanges first engage the rims 71 and 81 of the edge coating, which fill imperfections in the surfaces. Further, because of their exaggerated extension beyond the facial planes, the rims 76 and 81 conform well to any warping, deflection, or other deviations from flatness in the surfaces of the flanges. A good to perfect seal can thus be formed even when the surfaces of the flanges are in less than ideal condition. As the flanges are tightened further, their surfaces engage the face coatings 111 to enhance the seal and eventually engage and compress the gasket material of the base sheet 44. The result is an exceptional seal around the aperture of the gasket provided by the edge and face coatings as well as outstanding compression failure resistance provided by the fibrous gasket material of the base sheet 44. Even if the flange pressure on the base sheet or on any portion thereof falls below an acceptable level because, for example, of flange surface warping or poorly designed bolt placement, a good seal against both intersticial and interfacial leakage is maintained by the edge and face coatings of the gasket. Further, the very high initial flange pressures on the face coatings provides exceptional stress relaxation failure resistance, as detailed above.

Figure 14:
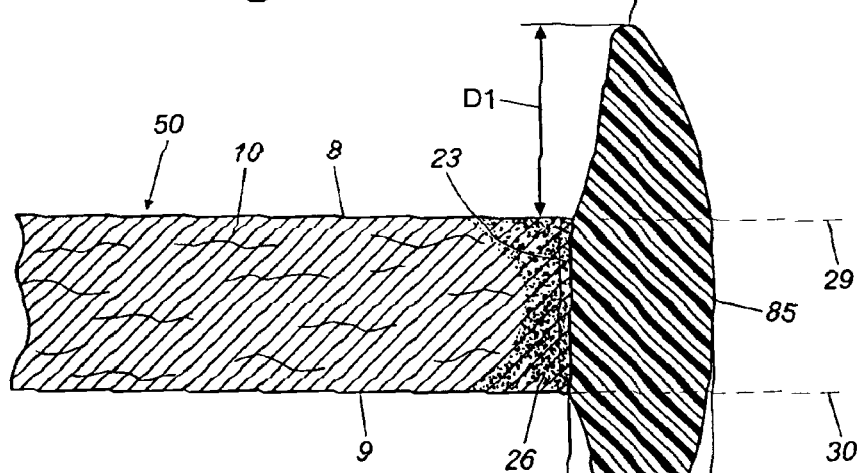

FIG. 14 illustrates yet another configuration of a possible edge coating on a compressible fibrous gasket that embodies principles of the invention. In this embodiment, the edge coating 85 is disposed on and penetrates the pores of the interior edge 23 of the base sheet as in other embodiments. The edge coating protrudes in this embodiment a distance D1 beyond the facial planes 29 and 30 to form protruding rims 120 and 122. In the illustrated embodiment, the edge coating 85 protrudes beyond both facial planes the same distance, D1. However, it will be appreciated that these protruding distances may also be different from each other depending upon the intended application of the gasket.

The edge coating 85 has an interior surface that is substantially convex between the rims 120 and 122 such that the edge coating is substantially thicker in its mid-portion than at its ends. The maximum thickness of the edge coating from the edge 23 of the base sheet to the interior surface of the edge coating is D2. It has been found that for a standard ¹⁄₃₂ (0.031) inch thick automotive gasket, a distance D1 of between 1 and 40 mils in conjunction with a distance D2 of between 1 and 50 mils can be used depending on the size of the gasket and its intended application. More generally, it has been found that a ratio of distance D1 to distance D2 of between about 0.1 and 3 is preferred. The optimum values of D1 and D2 can vary greatly depending upon the conditions under which a seal must be established. These values for a particular circumstance are dictated by a number of application specific factors such as the stiffness of the mating surfaces, their roughness, their flatness, whether or not the mating surfaces are machined, and whether or not the mating surfaces are likely to be mismatched. In general, however, the more precise, flat, and smooth the mating surfaces and the thicker the mating flanges, the smaller D1 is required to be to obtain a targeted sealability. On the other hand, when a seal must be established between mating surfaces that are imprecise, warped, rough, or where mating flanges are thin and tend to deflect, a larger value of D1 may be required to fill voids and establish the desired seal. One important advantage of the present invention is precisely that it is so adaptable to a wide variety of flange types and conditions simply by tailoring the edge coating to match the conditions under which sealability must be established.

Figure 15:
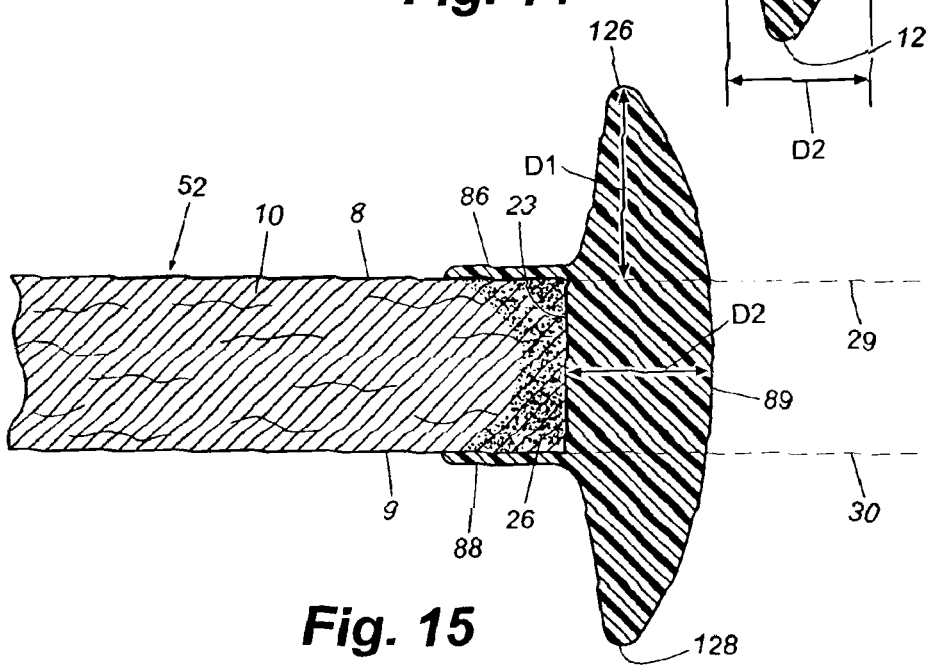

FIG. 15 illustrates another embodiment of the invention that is slightly different from the embodiment of FIG. 14. Here the edge coating is similar in shape to that of FIG. 14 having a convex interior surface and protruding beyond facial planes 29 and 30 a distance D1. The maximum thickness of the edge coating 89 is D2. As with the prior embodiment, the distance D1 preferably is between about 1 and 40 mils and the distance D2 preferably is between about 1 and 50 mils, however, other distances may be chosen depending upon the conditions under which the gasket is to be used. In any event, a ratio of the distance D1 to the distance D2 of between about 0.1 and 3 is preferable in most standard automotive applications.

The edge coating 89 in FIG. 15 extends or wraps a relatively short distance onto the respective faces 8 and 9 of the base sheet 52 to form face coatings 86 and 88, which extend in strips around the aperture of the gasket. The thickness and width of the face coatings 86 and 88 are selected to minimize any adverse impact on the compression failure resistance provided by the base sheet, at least in regions of the gasket where compression failure is a possibility. A thickness of the face coatings in such regions of less than about 11 mils and a width selected to cover less than about 50 percent of the faces of the base sheet is preferable, but not necessarily a requirement.

Figure 16:
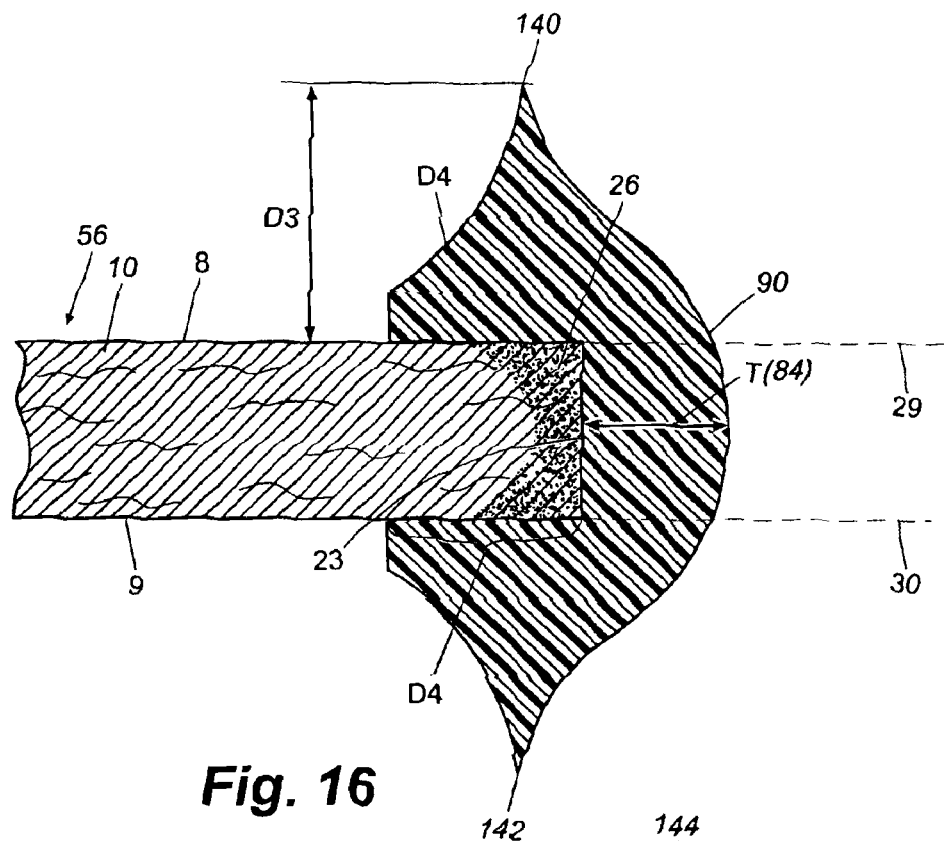

FIG. 16 illustrates another embodiment of an edge coated gasket that embodies principles of the invention. Here, the edge coating 90 is bonded to and penetrates the interior edge 23 of the base sheet 56 to form intrusion zone 26 and significantly overlaps onto the respective faces 8 and 9 thereof. The edge coating 90 has a substantially rounded interior face that extends between rather sharp or pointed extreme ends 140 and 142 of the protruding rims. The edge coating 90 has a maximum thickness T measured from the interior edge 23 of the base sheet and protrudes beyond the facial planes 29 and 30 a distance D3. The degree of protrusion beyond each of the facial planes in FIG. 16 is substantially the same. However, this is not a requirement of the invention and the distances could indeed be different depending on the intended application of the gasket.

The edge coating wraps onto the respective faces 8 and 9 of the base sheet a distance D4. It has been found preferable for a standard 0.031 inch thick automotive gasket that the maximum thickness T of the edge coating be about 50 mils and that the distance D3 that the edge coating protrudes beyond the facial planes be less than about 40 mils. It should be understood, however, that these distances may well be different from the preferred values depending upon the size and configuration of the gasket and its intended application. In any event, it has been found that a ratio of protrusion distance D3 to the thickness T of the edge coating preferably is in the range of from about 0.1 to about 3 to obtain superior sealability under most conditions.

The distance D4 that the edge coating wraps onto the faces 8 and 9 of the base sheet should be sufficiently small to minimize detrimental effects on the compression failure resistance of the gasket material (at least in regions where such is a concern) and sufficiently large to provide additional structural support, conformability, and rigidity to the edge coating. It has been found that a distance D4 of from about 5 mils to about 0.6 inches functions well in most applications, although different overlapping distances may be chosen. In any event, the distance D4 should be selected such that no more that about 50 percent and preferably no more than about 30 percent of the gasket faces are covered, at least in regions where good compression failure resistance is required. The protruding rims of the edge coating may be formed by separating stacked edge coated gaskets before the edge coating material is completely thickened in a "stack and coat" fabrication process described in more detail below. The relatively sharp nature of the rims results from a thicker less malleable rheology of the coating material at the time of separation.

In FIG. 16, the relative sharp extreme ends 140 and 142 are aligned slightly behind the interior edge of the base sheet. The final position of these extreme ends, which are artifacts of the separation process during fabrication, relative to the interior edge can be controlled by selecting the width D4 of the face coatings. For example, if the width of the face coating is less than that shown in FIG. 16, the extreme ends 140 and 142 will move to the right. For face coating widths less than some threshold, the extreme ends will align inside the interior edge and within the aperture of the gasket. Such a configuration may be preferred in many situations such as, for example, when sealing between warped flanges. In any event, the position of the sharp extreme ends relative to the interior edge can be predetermined to meet application specific requirements.

Figure 17:
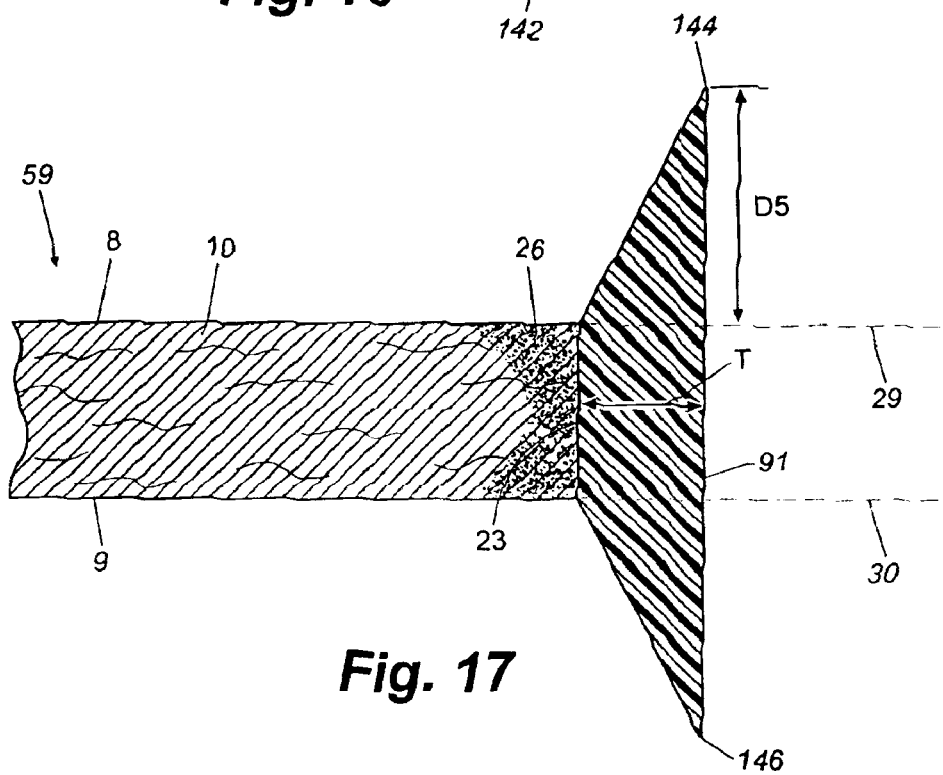

FIG. 17 illustrates another embodiment of the invention. Here, the edge coating 91 is applied to the interior edge 23 of the base sheet 58 and has a thickness T and a relatively flat inner face that is not bulbous or curved in cross-section. The edge coating protrudes beyond the facial planes 29 and 30 a distance D5 to form rims and the protruding rims are inwardly tapered beyond the facial planes to relatively narrow extreme ends 144 and 146. As with other embodiments, the protruding distance D5 in FIG. 17 for most standard automotive gaskets preferably is between about 1 mil and about 40 mils. The thickness T of the edge coating preferably between about 1 mil and about 50 mils. However, distances other than these may be selected for a particular gasket and application. In any event, the ratio of the protruding distance D5 to the thickness T preferably is between about 0.1 and 3.

As mentioned above, it has been found that compression failure resistance can be retained, at least in regions of the gasket where compression failure is possible, by limiting the thickness and width of the coatings on the faces of the base sheet. For the embodiments disclosed in FIGS. 2, 6, 8, 10, 13 and 15, the face coatings may have a width of up to about 0.6 inches from the interior edge of the base sheet, as long as the coating does not cover more than about 50 percent and most preferably no more than about 30 percent of the facial surfaces.

The thickness of the face coatings on the interior edge of the base sheet for each of these embodiments may vary significantly depending upon the size and configuration of the gasket and its intended end use. Generally, the greater the thickness of the edge coating, the lower the flange pressure at which compression failure of the gasket can occur. Since in most cases, the edge coating is intended to seal both against intersticial leakage and interfacial leakage, any coating thickness and configuration sufficient to provide such a seal is within the scope of the invention.

Since the fluid to be sealed generally contacts the gasket first at the interior edge bounding the aperture, coatings on the interior edge form a primary seal. When such a seal is established properly, fluid is prevented from reaching and coming into contact with the gasket material of the base sheet itself. Thus, prior problems associated with gradual degradation of the seal and resulting leakage due to progressive deterioration of the gasket material by the fluid is prevented. In the past, such degradation has not been uncommon and can be particularly serious where a single gasket must be designed to seal against different types of conditions. For example, the head gasket of an engine must seal against the high pressures and temperatures and the corrosive environment within the cylinders of the engine while at the same time sealing against leakage of coolant circulating through the engine's water jacket. If the gasket deteriorates due to exposure to either of these conditions, the segregation between the cylinders and water jacket can be lost and coolant can leak into the engine's cylinders and into the oil, which quickly can ruin the entire engine. The present invention prevents such failures by eliminating direct contact between the fluid being sealed and the gasket material from which the gaskets are made. Further, a different fluid specific edge coating material can be selected for each internal aperture of the gasket to customize each aperture for sealing against a particular fluid or environment.

In the illustrated embodiments discussed above, edge and facial coatings have been illustrated only around the interior aperture or apertures of a gasket. Such interior edge coatings provide exceptional sealability under many common conditions where pressurized or unpressurized fluids are being sealed in. For example, internally edge coated water pump gaskets provide exceptional seals against leakage of pressurized heated coolant from within an engine. Oil pan and oil cooler gaskets with interior edge coatings seal well against leakage of heated oil that may or may not be under pressure. In some instances, however, it is desired to seal not against the escape of a contained fluid but rather against the leakage of ambient atmosphere into a sealed area. One example is the sealing of the cylinder or cylinders of a vacuum pump, wherein substantial vacuums are created as the piston of the pump reciprocates within the cylinder. An engine's intake manifold gasket is another example of a gasket that seals against leakage into rather than out of the sealed area. In these and other situations, the invention may be implemented as detailed below relative to FIG. 24 by applying an edge coating to the exterior outside edge of a gasket instead of or in addition to an interior edge coating. The exterior edge coating then becomes the primary seal against intersticial and interfacial leakage of ambient atmosphere into the cylinder and functions just as the interior edge coatings described hereinabove, but in the opposite direction. Gaskets with interior and exterior edge coatings, or both, are intended to be within the scope of the present invention.

Suitable materials for use as the edge and face coatings of this invention vary widely depending upon the flange conditions and service fluids to be sealed. Generally, however, such materials include fusible powders, solid-filled polymers, and 100% solid fluids. Latex and/or elastomeric materials as well as silicone based materials and are preferred under some conditions. Specific preferred materials include, but are not limited to, organic, inorganic, and inorganic/organic hybrid polymers as well as filled polymers. Other polymeric coatings may include, but are not limited to, materials such as acrylic, acrylonitrile, acrylonitrile butadiene rubber NBR, fluoro polymers, hydrogenated NBR, styrene butadiene polymer, fluoroelastomer polymer, acrylic-acrylonitrile polymers, carboxylated acrylonitrile polymer, carboxylated styrene butadiene polymer, polyvinylidene chloride, chloroprene rubber polymer, ethylene propylene rubber polymer, ethylene/vinyl acetate polymer, epoxy, fluorosilicones, polyurethane, and silicone rubber. Each of the above materials may be UV curable, heat curable, or room temperature curable, or may require combinations of curing techniques. A polymeric coating may include a variety of fillers such as, for example, silica, carbon black, or clay to provide material properties adapted to a particular fluid or condition to be sealed. Polymeric powders that are heat fusible onto the faces and/or edges of the gasket base sheet also are acceptable and may be preferable for certain types of gaskets. Different, more exotic, or custom formulated materials now known or yet to be developed may be substituted for these preferred coating materials within the scope of this invention. Thus, while preferred materials are disclosed, the invention is not and should not be considered to be limited to the disclosed materials. Any material capable of providing the disclosed sealing properties is intended to be included within the scope of the invention.

Materials from which the base sheets of gaskets of the invention also may vary depending upon the intended application of the gasket. However, the base sheet preferably should be made of a compressible gasket material to take advantage of the complex sealing mechanisms discussed herein. Acceptable materials include, but are not limited to, fibrous gasket sheet materials, uncoated gasket materials, gasket materials with release coatings, soft gasket materials, and layered or laminated gasket materials sometimes called on-core gasket materials. An example of an on-core gasket material is a composite sheet with a compressible or non-compressible core having one desired property sandwiched between two layers of a second gasket material having another desired property. Engine head gaskets generally are made from on-core gasket materials. Where the base sheet is made from an on-core gasket material, an edge coating may be applied to less than all of the layers of the laminate such as, for example, only layers with porous edges, to seal against intersticial leakage. Preferably, however, the edge coating is formed on all of the layers to provide a continuous seal across the width of the gasket and to seal against leakage that may occur between layers of the gasket.

As mentioned above, the present invention has been found to be particularly advantageous when compressible fibrous gasket sheet material is used as the base sheet of the gasket. Examples of such materials that are commercially available include gasket sheet materials marketed under the trade names Synthaseal™, Pro-Formance™, and Micropore™. Most fibrous gasket materials are made principally from a fiber, a binder, and in some cases a filler, each included in proportional amounts. Although a wide range of proportional amounts are possible, gasket materials having at least 1% by weight of a binder and at least 5% by weight of a fiber have been found to be acceptable. Fillers can be added at a minimum level of about 1% by weight. Suitable ranges for these components include a range of from about 3% to about 40% by weight binder, from about 5% to about 70% by weight of a fiber, and, where applicable, from about 1% to about 92% by weight filler.

Types of gaskets particularly suitable for application of the present invention include, but certainly are not limited to, intake manifold gaskets for internal combustion engines, oil pan gaskets, valve cover gaskets, fuel pump gaskets, differential cover gaskets, transmission cover gaskets, water pump gaskets, air conditioning compressor gaskets, gas meter gaskets, and a variety of coupling flange gaskets for industrial pipelines, steam conduits, and other plumbing connections. The fluid to be sealed in each case will dictate to some extent the material selected to form the edge coatings of the gasket because the edge coating generally is in constant contact and must be chemically compatible with the fluid. For example, Chloroprene polymer or acrylonitrile may be preferred edge coating materials for gaskets exposed to refrigerants whereas acrylic or acrylonitrile may be preferred where oil is the fluid to be sealed.

The preferred embodiments have been described as having edge coatings covering all of the interior edge of the gasket's base sheet, which is preferred. However, it is also contemplated that less than all of the edge may be coated in some circumstances to conserve material and reduce costs without substantially degrading the sealability provided by the edge coating. For example, portions of the interior edge that are in the vicinity of bolt holes may not require an edge coating because the additional flange pressure applied in these regions reduce the need to provide an ancillary seal. However, superior sealability still is obtained by coating the entire interior edge. Accordingly, while partial edge coatings are intended to be within the scope of the invention, complete edge coatings are preferred.

Release coatings are sometimes applied to gaskets and particularly to fibrous gaskets to reduce gasket adhesion to mating surfaces and to make a spent gasket easier to remove after use. Release coatings typically are very thin, usually substantially less than 1 mil, and are designed to be surface coatings that do not penetrate the material of the gasket base sheet. Accordingly, most, but not all release coatings do not detrimentally affect the compression failure resistance of the gasket material. One example of a commonly used release coating that does not affect compression failure resistance of the gasket base sheet is formulated as a mica or vermiculite dispersion. The present invention encompasses and is applicable to gasket base sheet materials with and without release coatings.

Embodiments of the invention with edge coatings only and not face coatings have been found to be suitable for applications where higher flange pressures up to about 30,000 PSI are to be encountered by the gasket. Embodiments that include face coatings on one or both faces in addition to an edge coating have been found to be suitable for use with lower flange pressures up to about 15,000 PSI.

Figure 18:
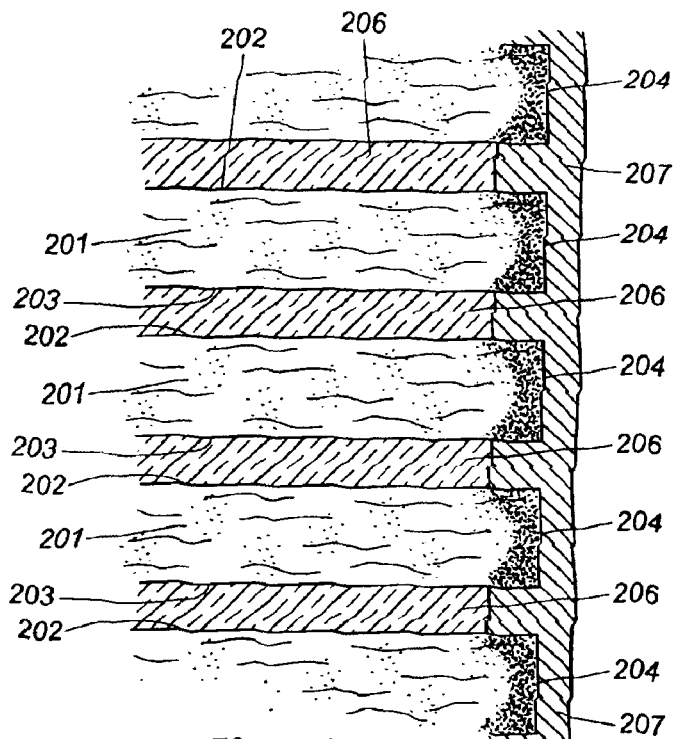
FIG. 18 is a cross-sectional view illustrating one embodiment of the stack-and-coat manufacturing process of this invention.
Figure 19:
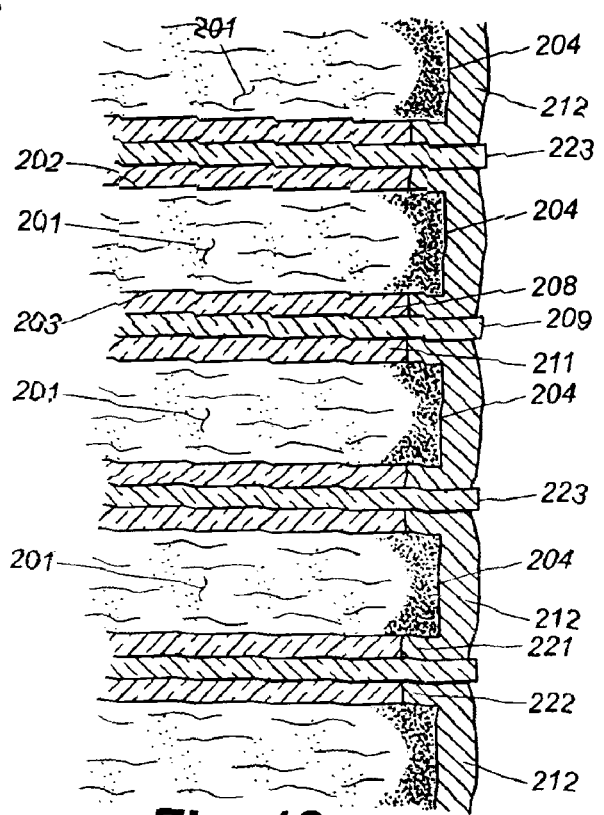
FIG. 19 is a cross-section view illustrating another embodiment of the stack-and-coat process.
Figure 20:
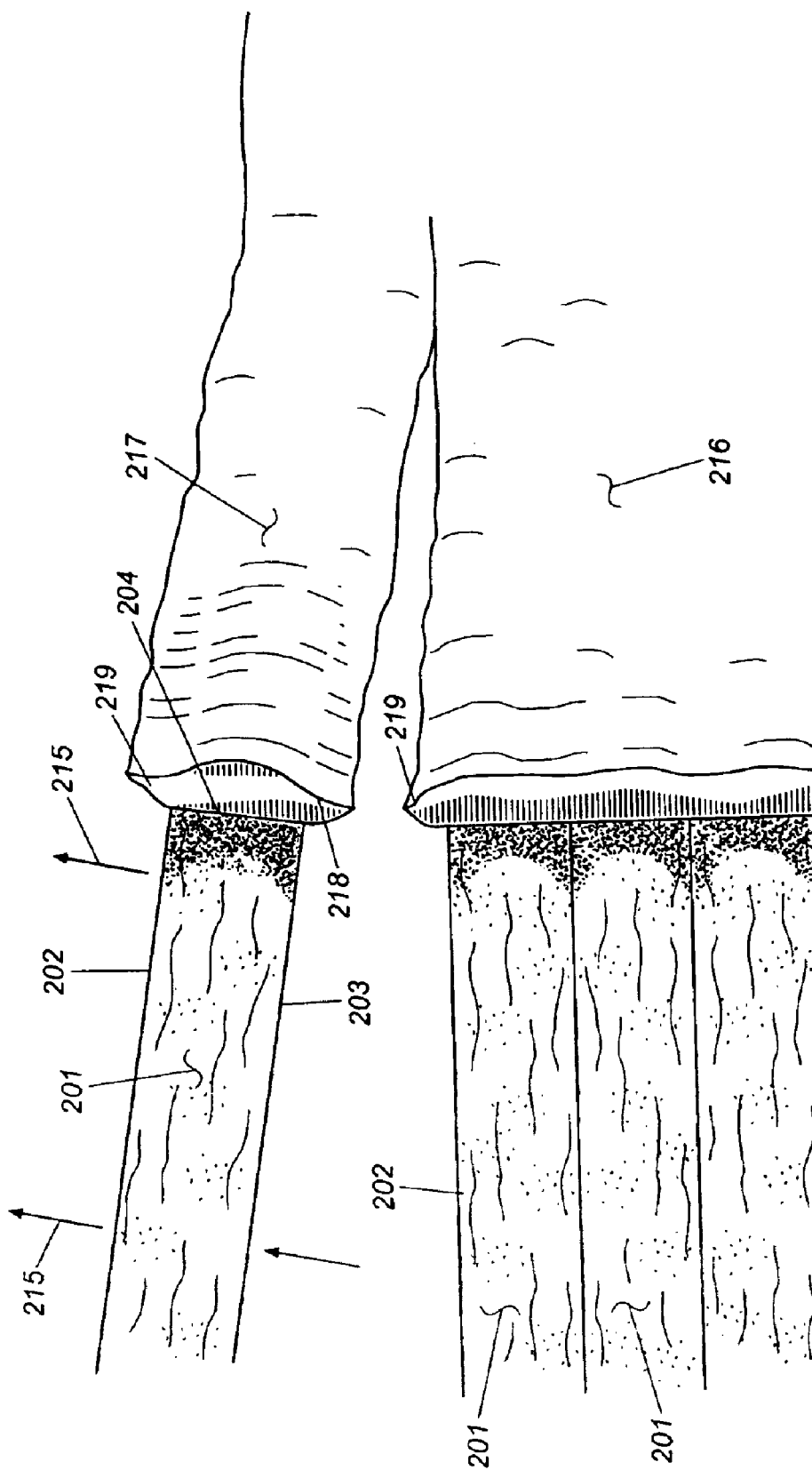
FIG. 20 is a cross-sectional view of yet another embodiment of the stack-and-coat process of the invention showing the formation of projecting rims by peeling individual gaskets from a gasket stack.

FIGS. 18 through 20 illustrate a unique methodology for fabricating edge coated gaskets of the present invention. The method generally is referred to herein as a "stack-and-coat" process and will be described in terms of specific embodiments and methodologies, although the invention is not limited to the particular exemplary embodiments. Generally, the stack-and-coat process of this invention comprises stacking a plurality of gasket base sheets together in a stack with the base sheets being aligned with each other. When stacked, the interior edges of the gaskets, each of which defines its gasket's aperture, align with each other to form a cavity. The cavity has a peripheral contour corresponding to the shape of the individual apertures and a depth determined by the number of gaskets stacked together. The interior edges of the gaskets are exposed on and define the walls of the cavity.

In one preferred methodology referred to as a "stack-and-rotate" process, the gaskets are stacked atop a base, which may be made of Plexiglas or other machinable material. The base is pre-machined to define a relatively shallow well having the size and contour of the apertures of the gaskets and the gaskets are positioned on the base so that the well is aligned with the cavity formed by the stack. The base thus closes off one end of the cavity and the floor of the shallow well defines the bottom of the cavity formed by the stacked gaskets. The well is filled or at least partially filled with an edge coating material, such as a polymeric material, in liquid form. The cavity is then closed off at its top end by, for example, clamping the entire gasket stack and base securely between a pair of heavy metal plates, which compress the gasket base sheets together tightly and seals off the open end of the cavity formed thereby.

With liquid polymer in the well and the cavity sealed between the metal plates, the entire assembly is tilted up on edge at a predetermined rate of tilt. This causes the liquid polymer to flow out of the well and onto the edges of the gasket base sheets. The rate of tilt is selected to insure even flow of polymer onto the edges and to prevent splashing or agitation of the polymer that might entrain air bubbles. While the optimum tilt rate for a particular situation is highly dependent upon factors such as the coating rheology, its viscosity, the base sheet material, and the complexity of the aperture shape, it has been found generally that tilt rates of less than about 3 to 4 degrees per second are acceptable for most applications.

When the stack has been tilted onto its edge, it is rotated about the axis of the cavity at a predetermined relatively slow rotation rate and through a predetermined number of rotations. During each complete rotation, the liquid polymer or other coating material flows under the influence of gravity completely around the interior wall of the cavity. In this way, the polymer is progressively deposited and builds up on the interior edges of the stacked gaskets to form their respective intrusion zones. The rate of rotation of the stacked gaskets is selected to insure that the coating material flows evenly around the cavity, that it flows completely into any crevices formed by the profile of the apertures, and that the coating material penetrates the porous interior edges of the stacked gaskets. Again, while the optimum rotation rate is dictated by many factors, it has been found generally that rotation rates from about 0.5 rotations per minute (rpm) to about 30 rpm are acceptable in most situations.

When the coating material has built up on the walls of the cavity to a predetermined thickness, rotation is discontinued and the assembly is tilted back down to allow excess coating material to flow back into the shallow well formed in the base. After excess coating material has drained away, a stack of gasket base sheets with a continuous coating covering the walls of the cavity formed by the exposed interior edges of the gaskets is formed.

Other methodologies of coating the walls of the cavity formed by a stack of gaskets have been used and each can be as acceptable as the stack-and-rotate methodology described above. These alternative methodologies will not be described in detail, but, in general, they include a "stack-and-fill" process, a "stack-and-spray" process, a "stack-and-wipe" process and a "stack-and-flame spray" process. In the "stack-and-fill" process, the cavity (or cavities) formed by a stack of gaskets is filled with the coating material in liquid form, which is left to set for a predetermined time. The coating material is then poured out of the cavity, leaving behind a continuous coating covering walls of the cavity formed by the exposed interior edges of the stacked gaskets. In the stack-and-spray process, the coating material is sprayed onto the walls of the cavity formed by the aligned interior edges of a stack of gaskets, again resulting in a continuous coating on the exposed interior edges of the gaskets. In the stack-and-wipe process, the coating material is applied to the exposed edges of a stack of gaskets using an appropriate tool such as a squeegee. Finally, in the stack-and-flame spray process, the coating material is caused to coagulate onto the exposed edges of the gaskets through a flame spraying process. The result of each of these methodologies is the same; a continuous coating on the aligned interior edges of the stacked base sheets.

With a continuous coating covering the interior edges of the stacked base sheets, the stack is removed from the coating apparatus and the edge coating material, which now coats the walls of the cavity formed by the stack, is allow to thicken partially but not completely such that it retains a degree of malleability. With the coating material partially thickened and malleable, each individual gasket is peeled off of the stack of gaskets. The peeling process causes the coating material on the edge of each gasket to be torn from the continuous coating on the walls of the cavity formed by the remaining gaskets. An edge coating on each gasket that is torn away is thus formed. Further, and significantly, since the edge coating material in most applications is only partially thickened and still malleable, the tearing away process stretches the edge coating material and elongates it to form the raised rims of the edge coating that protrude beyond the facial planes of the torn away gasket. By selecting coating material rheology, material build up, and partial thickening or dwell times in conjunction with the use of various types of spacers in the gasket stack, a wide variety of edge coating configurations, many of which are illustrated in FIGS. 5 through 17, can be formed.

When the individual edge coated gaskets have been peeled from the stack, the thickening of the edge coating material is completed to set the shape and final properties of the edge coating. In the case of polymeric edge coatings, the final thickening may be accomplished by moving the gaskets through a curing oven to accelerate the curing, i.e. the cross-linking, of the polymer. For other types of coating materials where drying is the mechanism by which thickening occurs, ovens may also be used to accelerate the evaporation of solvents from the coating material to complete the thickening thereof.

With their edge coatings fully thickened, the finished edge coated gaskets may be individually tested and certified as providing an acceptable seal, whereupon they are packaged for shipment to the end user. One method of testing and certifying the gaskets is to place each gasket between a pair of metal plates. The plates are then moved together toward the gasket until the edge coating is contacted and at least partially compressed by the plates. The final spacing between the plates and thus the compression stress applied to the edge coatings can be determined by metal spacers and is selected to prevent permanent distortion or deformation of the edge coatings while at the same time applying sufficient compression stress to create a seal. Compressed air is then pumped into the aperture of the gasket to a predetermined pressure and the pressure remaining after a set time period is noted. If the pressure does not change or if it changes less than a predetermined threshold amount, then the gasket is certified as providing the desired seal. The test also can be performed by drawing a predetermined vacuum in the aperture of the gasket and measuring the decay in the vacuum over time or after a predetermined time.

FIG. 20 illustrates the peeling process discussed above for creating edge coated gaskets with projecting rims that protrude beyond the facial planes of the gasket. Here a plurality of gasket base sheets 201 are seen to be stacked together with their interior edges aligned to define the walls of the cavity. In this figure, the stack has previously undergone one of the coating processes discussed above such that a continuous barrier 216 of edge coating material covers the exposed edges of the stacked gaskets to a predetermined depth. Further, the material of the barrier 216, which may be a polymeric material, is partially but not completely thickened such that it retains a measure of malleability. The top gasket of the stack is shown being peeled off of the stack in the general direction of arrows 215 to separate it from the remaining gaskets in the stack.

As the top gasket is peeled away, the edge coating material on its edge is progressively torn from the continuous barrier 216, forming edge coating 217 extending around the aperture of the torn-away gasket. Since the edge coating material is still malleable, the tearing process stretches and deforms the coating material along the line of the tear to form a rim 218 that protrudes beyond the facial plane of the base sheet. The other torn edge left on the stack is also stretched during the tearing process as indicated at 219. The result for each gasket peeled away is an edge coating having a pair of opposed projecting rims 218 and 219 that extend around the aperture of the gasket. Thickening of the individual edge coatings is then accomplished by curing or drying as discussed above to set the shape and elastic properties of the edge coatings. Edge coating configurations such as those illustrated in FIGS. 5, 14, 15, and 17 may be made using the embodiment of the process illustrated in FIG. 20

FIG. 18 illustrates another embodiment of the stack and coat process referred to herein as the "mold-in-place" process. In this embodiment, gasket base sheets 201 are again stacked with their interior edges 204 aligned with each other. However, in this embodiment, spacers 206 are disposed between each pair of base sheets 201 in the stack. The spacers 206, which preferably are made of a non-stick material such as nylon or Teflon, are formed with apertures that have the same shape as the apertures of the base sheets but that are slightly larger. The interior edges of the spacers 206 are thus recessed with respect to the aligned edges of the base sheets. FIG. 18 illustrates the spaced stack as it appears after having been coated with edge coating material 207 such as, for example, a polymer coating. The edge coating material 207 covers and penetrates the interior edges 204 of the base sheets to form their intrusion zones and also extends into the recessed space created by a spacer between each of the base sheets. It will thus be seen that the edge coating material wraps around partially onto the faces 202 and 203 of each base sheet to form face coatings that extend in strips around the apertures of the gaskets.

Just as in the embodiment of FIG. 20, the gaskets 201 in the mold-in-place process of FIG. 18 may be peeled away from the stack at a time when the edge coating material is partially thickened and still malleable. This causes the edge coating material to tear and to stretch and deform in the regions of the recesses between the gaskets to form edge and face coated gaskets with projecting rims that protrude beyond the facial planes of the gaskets. The thickening is then completed in a curing oven or otherwise to set the final shape and properties of the edge coatings. Gaskets with edge coating configurations such as those shown in FIGS. 13, and 16 may be formed by the mold-in-place process illustrated in FIG. 18.

FIG. 19 illustrates yet another mold-in-place process for manufacturing edge coated gaskets that exhibit features of the invention. In this embodiment, gasket base sheets 201 are stacked with their interior edges 204 aligned with each other. A set of stacked spacers 208, 209, and 211 are disposed between each pair of base sheets. Spacers 208 and 211 are disposed against the base sheets and have apertures that are slightly larger than the apertures of the base sheets to define recesses 221 and 222. Spacer 209 is sandwiched between spacers 208 and 211 and is formed with an aperture that is slightly smaller than the apertures of the base sheets such that spacers 209 extend to an edge that projects beyond the aligned interior edges 204 of the base sheets.

The stacked assembly in FIG. 19 is shown as it appears after the application of edge coating material through one of the processes described above or otherwise. It can be seen that edge coating material has flowed onto the interior edges 204 of each of the gasket base sheets and has penetrated the pores thereof to form intrusion zones. Edge coating material also has flowed into the recesses 221 and 222 formed by the spacers 208, 209, and 211 to form wrapped face coatings that extend in strips around the apertures of the gaskets. Because of the extension of the middle spacers 209 beyond the edges of the base sheets, the face coating strips take on a well defined molded shape. When the gaskets are pulled from the stack, the stretching and deformation of the edge coating material discussed relative to FIGS. 18 and 20 does not occur because the material on each edge is separated by the material on adjacent gaskets by the spacer 223. In this regard, the coating material may be allowed to thicken fully before the individual gaskets are peeled from the stack if desired since elongation of the coating material to define raised rims is not required. The result is a molded wrapped edge and face coating that can be precisely dimensioned and shaped by selection of spacers having appropriate thicknesses and aperture sizes. For example, if thinner face coatings are desired, then spacers 208 and 211 can be relatively thinner whereas relatively thicker spacers result in relatively thicker face coatings. The embodiment of the process shown if FIG. 19 is useful for producing edge coated gaskets with cleanly molded edges such as those illustrated in FIGS. 4, 7, 8, 9, and 13.

While three embodiments of the mold-in-place manufacturing process of the invention have been illustrated, it will be understood that numerous variations of the illustrated and described embodiments are possible. For example, a variety of thicknesses of spacers with a variety of sizes and shapes of apertures may be used to form edge coatings with an equal variety of shapes and advantages. Thus, the exemplary embodiments described herein should not be considered exhaustive but are provided only as examples of the preferred mode of practicing the invention.

While FIGS. 1 through 17 illustrate many possible configurations of edge coatings that embody principles of the invention, FIGS. 21 through 23 illustrate three preferred configurations that have proven advantageous and that together represent the best mode known to the inventors of carrying out the invention. FIG. 21 illustrates an edge coated gasket 251 comprising a base sheet 252 of a compressible fibrous gasket material. The base sheet 252 has opposed faces 253 and 254 that lie in respective facial planes and that bound a substantially porous internal structure 256 of the base sheet. As detailed above, the gasket material of the base sheet may be any of a wide variety of gasket materials depending upon the conditions of the intended use of the gasket. The base sheet 252 is die-cut or otherwise formed to have an interior edge 257 that surrounds an aperture of the gasket.

An edge coating 258 is disposed on the interior edge 257 of the base sheet and preferably, but not necessarily, is formed of a polymeric material appropriate for the particular fluid type and physical conditions to which the gasket will be exposed. The edge coating has a central portion 259, a first projecting rim 261 that projects beyond the facial plane in which face 253 lies, and a second projecting rim 262 that projects beyond the facial plane in which face 254 lies.

The edge coating 258 is formed by the stack-and-coat process outlined above relative to FIG. 20. During the process, the dwell time before individual gaskets are peeled from the stack is chosen in conjunction with the rheology of the polymeric material to produce an edge coating with the configuration and generally soft rounded contours illustrated in FIG. 21. More specifically, the edge coating 258 is relatively thicker in its central portion 259 and gradually decreases in thickness toward the protruding rims 261 and 262. The extreme edges of the rims 261 and 262 are also somewhat smoothly contoured as shown.

The polymeric material of the edge coating 258 penetrates the porous interior edge 257 of the base sheet a predetermined distance to form an intrusion zone 263 within which the pores of the gasket material are substantially filled and closed by the polymeric material. As detailed above, the intrusion of the polymeric material functions to seal off the porous interior edge of the base sheet, bond the edge coating firmly to the edge, and to form a strip of relatively higher overall density surrounding the aperture of the gasket to concentrate compression load in this region. If the base sheet 252 is made of a standard automotive gasket material with a thickness of 0.031 inches, then the rims 261 and 262 preferably protrude beyond the facial planes a distance of between about 1 to about 40 mils and the thickness of the edge coating in its central region preferably is between about 1 and about 50 mills, all depending upon the intended application of the gasket. The preferred ratio of the protruding distance to the thickness for most situations is between about 0.1 and about 3.

The edge coated gasket of FIG. 21 has been found to provide outstanding performance in a wide variety of sealing environments. The geometry of the coating exhibits a relatively low spring rate at the tips of the protruding rims, which allows the edge coating to conform to and accommodate rough and/or irregularly shaped flange surfaces. When the edge coating is compressed between flange surfaces, the coating-edge interface and the intrusion zone add stiffness and generate considerable sealing force under full compression.

Stress relaxation, which is a common failure mode in controlled compression rubber gaskets, is addressed by the gasket of FIG. 21 in at least two ways. First, the base sheet is compressible rather than rigid. This actually improves the polymer edge compression over time as the base sheet gradually compresses under the load of the joint. Second, the sealing mechanism of the polymer edge coating is a combination of sealing stress and surface adhesion to the flange surfaces. Therefore, even if sealing stress on the edge coating decreases over time, the seal provided by the coating is not likely to be compromised. The result is a seal of exceptional integrity and longevity far beyond that provided by a gasket without an edge coating or even a controlled compression rubber gasket. Further, shear stresses in a joint are accommodated by the elasticity of the edge coating and the compressible base sheet material, which can extend up to 20 percent of its thickness under shear loads without sliding on the flange surfaces. Surface abrasion and rubber-to-carrier delamination, which often causes failure of controlled compression rubber gaskets, is thus virtually eliminated.

FIG. 22 illustrates the best mode known to the inventors of carrying out the wrapped edge embodiment of the present invention. The edge coating configuration shown here results from the mold-in-place fabrication process described above relative to FIG. 19. Edge coated gasket 266 comprises a compressible porous base sheet 267 of gasket material having faces 268 and 269 that lie in respective facial planes and bound a substantially porous internal structure 271 of the base sheet. Interior edge 272 surrounds an aperture of the gasket and the porous internal structure is exposed on the edge. Coating 273 is disposed around the interior edge of the base sheet and includes an edge coating 274, which wraps onto the faces of the base sheet to form-face coatings 276 and 277. The coating 273 is formed of an appropriate polymeric or other suitable material and penetrates the porous edge of the base sheet to define an intrusion zone 278, which seals the pores, bonds the edge coating, and stiffens or densities the interior edge portion of the base sheet to concentrate available compression load.

For a standard 0.031 inch thick automotive gasket, the thickness of the face coatings 276 and 277 preferably is less than about 11 mils, at least in regions of the gasket where compression failure resistance of the base sheet must be preserved. Further, the width of the face coatings in these regions preferably is between about 5 mils to about 0.6 inches depending upon the flange width of the gasket and in any event cover less than about 50 percent of the area of the base sheet. The thickness of the edge coating preferably ranges between about 1 mil and about 50 mils, as required by the specific gasketing application.

The edge and face coated gasket of FIG. 22 is a good option for sealing joints where relatively low flange pressures and/or rough, damaged, warped, or thin flange surfaces are to be encountered. In addition to the sealing mechanisms discussed above relative to FIG. 21, the wrapped edge configuration of FIG. 22 provides an additional sealing mechanism by concentrating the available clamping load on the face coatings, creating sealing forces up to 10 times higher than with non-treated or controlled compression rubber gaskets. Thus, a loss of even a large percentage of the initial clamping load does not reduce the compressive stress below the level required to maintain a seal.

FIG. 23 illustrates a third embodiment that embodies the best mode of the present invention. In this embodiment, the edge coating is similar to that of FIG. 21 in that there is no coating on the faces of the gasket. However, the edge coating is substantially thinner and the protruding rims beyond the facial planes are substantially shorter than in FIG. 21. This configuration has been found advantageous for sealing high compression joints and/or high quality joints between rigid, flat, and smooth flange surfaces. In these types of joints, the potential for leakage due to warping, surface roughness, or compression gradients is low; however, intersticial leakage can still be a factor. Thus, the primary sealing mechanism of the edge coating in FIG. 23 is provided by the sealing of the exposed porous internal structure of the base sheet around the aperture of the gasket to prevent intersticial leakage.

The gasket 281 in FIG. 23 comprises a compressible porous base sheet 282 having opposed faces 283 an 284, which lie in respective facial planes and bound the porous internal structure 286 of the base sheet. An interior edge 287 surrounds an aperture of the gasket and the porous internal structure of the base sheet is generally exposed on this edge. A relatively thin edge coating 288 is disposed on the edge 287 and is deposited as described above. The material of the edge coating is chosen for its ability to penetrate and seal the exposed pores on the edge of the base sheet, forming a sealed and densified intrusion zone 287 around the aperture. The edge coating 288 protrudes slightly beyond the facial planes of the base sheet to form relatively small rims that surround the aperture. The same sealing mechanisms as in the gasket of FIG. 21 are exhibited by this embodiment; however, contributions to the seal due the conforming of the edge coating to flange surface contours and roughness are significantly less prevalent because these factors are much less significant in cases of highly stressed joints with flat smooth flange surfaces. An excellent seal against intersticial leakage is provided by the intrusion zone, which also densifies the edge region to concentrate available compression force to enhance the seal even further. As with all embodiments of the invention, the material of the edge coating is selected to be substantially impervious to and chemically non-reactive with the particular fluid to be sealed by the gasket.

Figure 24:
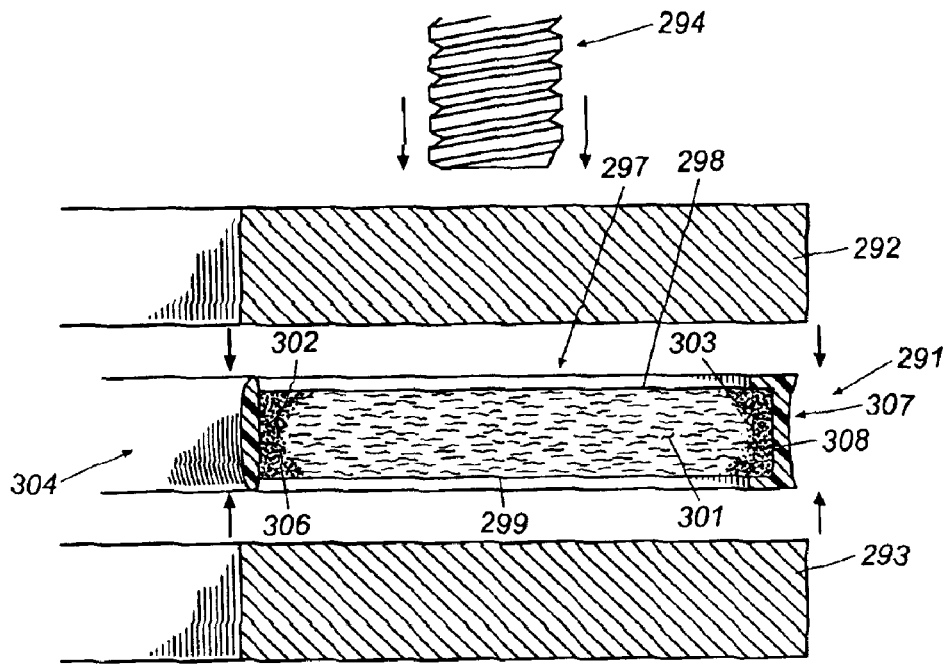
FIG. 24 is a cross sectional view of an edge coated gasket having edge coatings on both its interior and exterior edges and shown poised between a pair of flange surfaces.
Figure 24:

FIG. 24 illustrates an edge coated gasket according to the invention with edge coatings on both an interior edge and the exterior edge of the base sheet. As mentioned above, such a gasket may be advantageous when sealing against seepage of atmospheric gasses into a chamber such as, for example, in a vacuum pump or an engine's intake manifold. The gasket 291 is shown poised between a pair of flanges 292 and 293, which may be bolted together with a bolt 294 and nut 296 to compress the gasket between the flange surfaces. Of course, the flanges shown in FIG. 24 are greatly simplified for clarity of discussion and it will be understood that the gasket may in reality be compressed between mating surfaces of virtually any configuration, be they the surfaces of actual flanges or other components to be mounted together.

The gasket 291 comprises a compressible porous base sheet 297 having faces 298 and 299 that lie in respective facial planes and that bound the porous internal structure 301 of the base sheet. The base sheet is cut or otherwise formed with an interior edge 302, which surrounds an aperture of the gasket, and an exterior edge 303, which defines the outer perimeter of the gasket. An interior edge coating 304 is disposed on the interior edge of the base sheet and penetrates the pores of the edge to define an interior intrusion zone 306. Similarly, an exterior edge coating 307 is disposed on the exterior edge 303 of the base sheet and penetrates the pores of the exterior edge to form an exterior intrusion zone 308.

The interior edge coating is similar to the coating of FIG. 21 and does not wrap to form face coatings and the exterior edge coating is similar to the coating of FIG. 22 in that the coating material wraps around the exterior edge to form face coatings. It should be understood that the illustrated combination of edge coating configurations in FIG. 24 is selected for illustration only and any combination might be chosen to suit a particular sealing application. However, edge coated gaskets with edge coatings on both interior and exterior edges are advantageous in many situations and are within the scope of the present invention.

Figure 25:
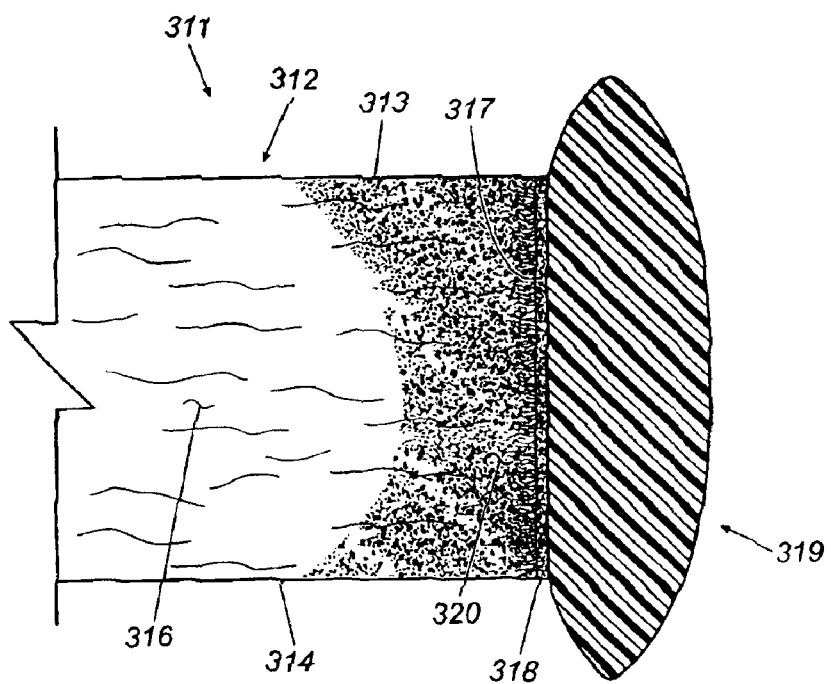
FIG. 25 is a cross-sectional view of another embodiment of an edge coated gasket according to this invention showing an undercoating of primer disposed between the edge of the base sheet and the edge coating.

FIG. 25 illustrates an alternative embodiment of the present invention. In previous embodiments, various edge coatings are presented and the intrusion of the coating material into the edge of the base sheet to form an intrusion zone is discussed. The embodiment of FIG. 25 functions the same as the previous embodiments in terms of its sealing mechanisms and performance. However, in this embodiment the edge coating material itself does not penetrate the porous edge of the base sheet. Instead, a primer or undercoat of a first material is applied to and penetrates the pores of the edge to form the intrusion zone. The edge coating is then applied to the primer. Such a configuration may be chosen for a variety of reasons such as, for example, situations wherein the edge coating material and the material of the gasket are chemically incompatible or do not bond well to each other. The embodiment of FIG. 25 is a solution and is intended to be encompassed within the scope of the present invention.

Referring in more detail to FIG. 25, an edge coated gasket 311 has a base sheet 312 of compressible gasket material with faces 313 and 314 bounding the fibrous internal structure 316 of the gasket. An interior edge 317 of the base sheet defines an aperture of the gasket. An undercoating of primer 318 is applied to the interior edge 317 and penetrates and seals the pores on the edge to form an intrusion zone 320. The primer is thus securely bonded to the edge coating and forms a densified intrusion zone, which concentrates compression forces and enhances the seal provided by the gasket.

An edge coating 319 is applied as discussed above to the undercoating of primer and is formed with one of the generally preferred profiles of this invention. The primer is selected to be chemically compatible with and to penetrate and adhere to the edge of the gasket and also to provide a layer with which the edge coating material is compatible and to which the edge coating material adheres. Thus, it is seen that the overall modes of functionality of the edge coated gasket 311 is substantially the same as the previously discussed embodiments, except that an undercoat of primer material is disposed between the edge coating and the edge of the base sheet and it is the primer material that forms the intrusion zone rather than the edge coating material.

The present invention and the many advantages thereof as well as the foundation for some of the design parameters discussed herein may be understood better from the following examples and results of tests performed on edge coated gaskets fabricated according to the invention. The tests were performed, in part, to quantify and determine realistic limits for many of the design parameters, such as, for example, preferred thickness and width of face coatings. However, these examples are included to illustrate and clarify the invention and not to limit the invention.

EXAMPLES

Example 1

A. Crush Test—ASTM F1574-95

In this example, a crush test was performed on gasket samples prepared in accordance with the present invention using test standard ASTM F1574-95, which is an industry standard for testing the compression strength of a gasket under elevated temperatures. Each gasket was subjected to a controlled amount of flange pressure at 300 degrees Fahrenheit under uniform load conditions. The deformation of the sample as a percentage increase in surface area over the original gasket surface area was then measured. To prepare test gaskets, identical annular gaskets were cut from a cellulose-based paper gasket sheet material. Each gasket included upper and lower opposing faces, an interior edge defining an aperture, and an outer peripheral edge. The gaskets had an inner diameter of 0.515 inches, an outer diameter 0.950 inches, and a resulting flange width of 0.2175 inches.

Table 1 shows the results of the crush test in terms of the change in gasket area as a function of flange pressure. The results for a completely uncoated gasket, i.e. a gasket with no edge or face coatings, are shown in column A and serve as the control. Column B contains the test results for a gasket having an NBR latex coating on the interior edge of the gasket. Column C contains the test results for a gasket with an NBR latex coating on its interior edge and a face coating of a second material formed on each face and extending in a strip surrounding the aperture of the gasket. The face coatings contact the NBR latex edge coating as illustrated in FIG. 2. The face coatings on the sample were 4 mils thick and were ⅛ inch wide, measured radially outwardly from the interior edge of the gasket. Thus, the face coatings in this test covered approximately 50 percent of the area of each face. Column D contains results for a gasket having a coating over its entire surface of a room temperature vulcanizable silicone from Loctite Corp. In this experiment, a change in gasket surface area greater than 10 percent is deemed indicative of compression failure and is considered unacceptable. The higher the number, the worse the compression failure resistance and the more undesirable the gasket.

TABLE 1

Percentage Change In Gasket Surface Area As a Function of Flange Pressure

| Pressure PSI | A | B | C | D |
|---|---|---|---|---|
| 2500 | — | — | — | 2 |
| 3250 | — | — | — | 21 |
| 5000 | 1 | 1 | 1 | 60 |
| 10,000 | 2 | 1 | 9 | — |
| 15,000 | 2 | 4 | 35 | — |

The above data demonstrate that an untreated gasket alone (column A) exhibits exceptional compression failure resistance at all flange pressures. On the other end of the spectrum, a gasket having a coating on its entire surface (column D) experiences compression failure even at a relatively low flange pressure of 3250 PSI. It is clear, then, that coatings on the faces of a gasket deteriorate significantly the compression failure resistance of the gasket. However, the data also demonstrate that edge coated gaskets according to the present invention (column B) have a minimum impact on compression failure resistance, exhibiting a surface area change of far less than 10%, even under a flange pressure of 15,000 PSI. In fact, the edge coated gasket in this test exhibited compression failure resistance almost as good as the bare uncoated control gasket (column A). The results shown in column C demonstrate that a gasket having both an edge coating and a face coating extending in a relatively narrow strip around the gasket aperture exhibits slightly more degraded compression failure resistance, showing unacceptable results above a flange pressure of 10,000 PSI.

The overall conclusion to be drawn from this test is that uncoated gaskets exhibit excellent compression failure resistance. Coatings, and particularly face coatings, on the gasket degrade this compression failure resistance by an amount proportional to the percentage of face's surface area covered by the face coating. Gaskets with face coatings covering 50 percent of the facial areas of the gasket result in compression failure above flange pressures of about 10,000 PSI. Thus, face coatings on gaskets of the present invention should cover less than about 50 percent of the facial area of the gasket and preferably less than about 30 percent. Gaskets with completely coated faces exhibit compression failure even at low flange pressures and generally are unacceptable.

B. Sealability Test

Three groups of standard EMALT gaskets (A, B, and C) having inner diameters of 2.5 inches and outer diameters of 3.75 inches were prepared as described above. The face coatings for the gaskets in column C were 3/16 inch wide. Thus, the face coatings on these gaskets covered approximately 26 percent of the areas of the gasket faces.

Each of the gasket samples was clamped between the flanges connecting two halves of a test cylinder and the cylinder was pressurized with nitrogen after tightening the flanges to obtain the flange pressures indicated in Table 2. The test was performed using a smooth flange with mating surfaces measuring 18 Ra, where Ra is the average roughness value measured in micro-inches, and on a rough flange having mating surfaces measuring 250 Ra. The cylinder was pressurized with nitrogen to an internal pressure of 14 PSI. The elapsed time until the pressure within the cylinder decayed to 13 PSI was measured as noted in Table 2.

TABLE 2

Sealability As a Function of Gasket Type and Flange Roughness

| Gasket | Time (min) | Flange Characteristics | |
|---|---|---|---|
| | | Flange Pressure | Roughness |
| A | 1.5 | 2100 PSI | 18 Ra |
| A | 1.0 | 2100 PSI | 250 Ra |
| B | 11.0 | 2100 PSI | 18 Ra |
| B | 11.0 | 2100 PSI | 250 Ra |
| C | Total Seal | 300 PSI | 18 Ra |
| C | Total Seal | 300 PSI | 250 Ra |

The uncoated control gasket A resulted in relatively high leakage times of between 1 and 1.5 minutes. It is thus clear that bare uncoated gaskets do not provide exceptional sealability at the tested flange pressures. An edge coated gasket (gasket B) exhibits roughly a 10 fold improvement in sealability over the control gasket. However, as illustrated by the data for gasket type C (gaskets with both an edge coating and face coatings), a total seal is obtained, i.e. no measurable leakage is noted either for smooth or rough flanges, even at an extremely low flange pressure of 300 PSI. It is concluded from this test that in applications where outstanding sealability is required even under very low flange pressures, a gasket with both an edge coating and face coatings are preferable. This test, in conjunction with the results of the crush test of Example 1, leads to the conclusion that face coatings to enhance sealability should cover less than about 50% of a gaskets face and more preferably less than about 30% in order to preserve the compression failure resistance of the gasket material. Judicious selection of the width of face coating strips provides simultaneously both outstanding sealability and compression failure resistance. This test also demonstrates that a bare uncoated gasket leaks significantly under flange pressures as high as 2100 PSI. A gasket with only an edge coating seal performs significantly better than a bare gasket, but still provides less than a total seal. Gaskets with both edge and face coatings provide total seals under the conditions of this test.

Example 2

In the test of this example, the sealability effectiveness of edge coatings was measured. Identical gasket base sheets were obtained from the same gasket sheet material. Each gasket included opposed faces and an interior edge surrounding and defining an aperture of the gasket. Gasket A was left completely uncoated and represents the control in this test. A second gasket, gasket B, was provided with an edge coating only on the interior edge of the base sheet. The edge coating comprised a commercially available NBR latex material.

A high-pressure sealability test was performed on gaskets A and B. The gaskets were placed between the flanges connecting two halves of the cylinder and the flanges were tightened to compress the gaskets with the indicated flange pressures. The cylinder was then pressurized with nitrogen to a pressure of 225 PSI for one hour. The pressure remaining in the cylinder after one hour was then measured and noted as indicated in the chart below. Gaskets with highest sealability are evidenced by the highest residual pressure in the cylinder after one hour. Table 3 shows the results of the test.

TABLE 3

Sealability of Gaskets

| Gasket | Flange Pressure (PSI) | |
|---|---|---|
|  | 500 | 1000 |
| A uncoated | gross leak | gross leak |
| B coated | 218 PSI | 223 PSI |

Gasket A with no coating exhibited such a gross leak that it was not possible in this test to determine the residual gas pressure after one hour. Thus, bare uncoated gaskets provide unacceptable sealability, at least for relatively low flange pressures between 500 and 1000 PSI. However, providing an edge coating on the interior edge of the gasket base sheet (gasket B) results in a gasket with drastically improved sealability at these low flange pressures. Even at the lower flange pressure of 500 PSI, the edge-coated gasket held the gas pressure at 218 PSI at the conclusion of one hour, thus loosing only 7 PSI. Thus, it may be concluded that providing an edge coating on a gasket base sheet results in a gasket that exhibits exceptional sealability at low flange pressures where an uncoated gasket alone is unacceptable.

Example 3

In this test, the same gaskets tested for sealability in Example 2, were subjected to the crush test described in Example 1. Uncoated gasket A served as the control. Gasket B was provided with an edge coating as described. The two gaskets were then subjected to the crush test described above. The results of the test, in units of percent change in surface area of the gaskets, are outlined in Table 3.

TABLE 4

Percentage Area Change as a Function of Flange Pressure

| Gasket | 5,000 PSI | 10,000 PSI | 15,000 PSI |
|---|---|---|---|
| A uncoated | 1 | 10 | 16 |
| B edge coated | 2 | 9 | 16 |

The results of this test demonstrate that the edge coated gasket, which demonstrates exceptional sealability as shown in Example 2, also exhibits compression failure resistance substantially unchanged from a bare uncoated gasket (gasket A). Compression failure resistance of the two was the same at 15,000 PSI flange pressures. Conclusions to be drawn from this example in conjunction with the test of Example 2 are that edge coated gaskets according to the present invention provide both high compression failure resistance and exceptional sealability under a wide range of flange pressure conditions from 500 PSI to 15,000 PSI. This is a significant improvement over bare uncoated gaskets, which show virtually no sealability at lower flange pressures and reduced sealability even at higher flange pressures.

Example 4

In this example, gaskets according to the present invention were tested for sealability when compressed between flanges that are warped, i.e. that have flange surfaces-that vary from flat. These conditions can and do occur in the real world for a variety of reasons and, when present, can result in a joint with serious sealability problems using prior art gaskets. In this test, a warped flange was simulated by deforming the test flange of the aforementioned pressure cylinder into a slightly concave shape. The concavity, or deviation from flat, of the test flange measured 3 mils at a central portion of the flange, which was approximately 1.42 inches in diameter. The warped flange was then fitted in turn with a gasket A (an uncoated control gasket) and a gaskets C (a gasket with both an edge coating and face coatings). The flange bolts were torqued to 13.5 foot-pounds and the cylinder was filled with oil and pressurized with air to 5 PSI.

Leakage of oil across the flanges was measured after an elapsed time of 46 hours. Intersticial and/or interfacial migration of oil across greater than ⅔ of the width of the flanges was considered in this test to indicate gasket failure. The results of the test were as follows. With gasket A (the uncoated control gasket) the oil migrated completely across the width of the flanges and leaked to the outside of the test cylinder after 46 hours. Obviously, the uncoated gasket failed to provide a seal under warped flange conditions. However, gasket C, with edge and face coatings, resulted in no migration of oil either through the gasket material or between the gasket and the flange surfaces after 46 hours. In other words, the edge and face coated gasket in this test provided a perfect seal under warped flange conditions. A conclusion to be reached from this test, therefore, is that gaskets with an edge coating and face coating covering less than 30% of the area of the gasket face according to the present invention, provide exceptional sealability even when used with flanges having warped mating surfaces.

As illustrated in Example 1, such gaskets also provide exceptional sealability when used with flanges having rough or damaged flange surfaces. It is suspected that this advantageous property results from the fact that the edge coating material tends to fill any imperfections or roughness in the flange surfaces and also tends to conform to gradual warpage or other deviations from flat of the flange surfaces. Adhesion between the coating material and the flange surfaces also is thought to contribute to the exceptional performance demonstrated by gaskets of the present invention.

Example 5

In this example, an annular gasket base sheet having the dimensions described in Example 2 was cut from a standard fibrous gasket material. The interior edge of the base sheet was coated with a commercial acrylic latex coating. The coating was applied to the interior edge of the base sheet and projected beyond the facial planes of the base sheet to form raised rims extending around the aperture of the gasket. Further, the edge coating had a rounded inner surface and was thicker in its central portion than around its rim portions. The thickness of the base sheet was about 32 mils and the raised rims of the edge coating protruded approximately 27 mils beyond the facial planes of the base sheet. In these aspects, the edge coating of this example resembled the edge coating illustrated in FIG. 5.

The gasket was tested by clamping it between the flanges of the test cylinder described above. Flanges having smooth flange surfaces (18 Ra) were used. The cylinder was pressurized with Nitrogen to 14 PSI and the number of minutes until the pressure decayed to 13 PSI was measured and noted. The results for gasket A in Example 2 above were used as the control. The results of this test are as follows. The uncoated control gasket allowed the pressure within the cylinder to decay to 13 PSI in a mere 1.5 minutes and required a relatively high flange pressure of 2100 PSI. As discussed above, this is considered unacceptable performance. However, the edge coated gasket in this test provided a total seal, i.e. no loss of pressure was measurable, even at flange pressures as low as 300 PSI.

Conclusions to be drawn from the results of this test and the other tests are that uncoated prior art fibrous gaskets generally provide poor sealability at flange pressures of about 2100 PSI, even though they generally exhibit good compression failure resistance. In contrast, an edge coated gasket formed with raised protruding rims according to the present invention delivers near perfect to perfect sealability even at low flange pressures of about 300 PSI. The test of Example 1 demonstrates that such edge coated gaskets also deliver very good compression failure resistance, in part because no portion of the faces of the gasket base sheet are coated. Thus, edge coatings with projecting rims such as those illustrated in FIGS. 5, 9, 12, 14, 17, and 21 provide excellent sealability similar to that provided by edge and face coated gaskets while at the same time preserving virtually all of the compression failure resistance inherent in gasket material of the base sheet.

Example 6

For the test of this example, an annular gasket base sheet with the dimensions discussed in Example 1 was cut from a commercial fibrous gasket material. A silicone edge coating was applied to the interior edge of the base sheet with a cross-sectional profile resembling the edge coating shown in FIG. 6. More specifically, the edge coating overlapped onto one face of the base sheet to form a face coating extending in a strip around the aperture of the gasket. The edge coating was approximately 100 mils thick at the center of the interior edge of the base sheet and the face coating covered less than 30% of the surface of the face. The edge coated gasket was tested between the flanges of the test cylinder pressurized with nitrogen to 14 PSI. The elapsed time until the pressure decayed to 13 PSI was measured and noted. Smooth surfaced flanges (18 Ra) were used in this test and the results from Example 2 for gasket A (uncoated gasket) were used as the control.

The control gasket resulted in a decay time to 13 PSI of 1.5 minutes at a flange pressure of 2100 PSI. In contrast, the edge coated gasket in this test provided total sealability (the pressure never measurably decreased in the cylinder) at the same flange pressure of 2100 PSI. Thus, at least at flange pressures above 2100 PSI, an edge coated gasket with a face coating strip on one face provided superior sealability as compared to uncoated gaskets. Further, as can be seen from the test of Example 1, such edge coated gaskets also substantially preserve the good compression failure resistance of the gasket material of the base sheet. Thus, overall gasket performance is substantially enhanced with gaskets of the present invention.

Example 7

In the test of this example, an edge coated gasket resembling that of FIG. 8 was tested for sealability. An annular gasket with a silicone edge coating was fabricated. The edge coating wrapped around onto both of the faces of the gasket base sheet to form face coatings that extended in a strip around the aperture of the gasket. The face coatings covered less than 30 percent of the faces of the base sheet. The edge coated gasket was tested with the smooth flanged (18 Ra) test cylinder pressurized with nitrogen to 14 PSI. Elapsed time until the pressure decayed to 13 PSI was measured and noted. Gasket A of Example 2 was used as the control. The control gasket resulted in a decay time to 13 PSI of 1.5 minutes and required a flange pressure of 2100 PSI. The edge coated gasket provided a total seal (pressure never measurably decreased in the cylinder) at a substantially lower flange pressure of 300 PSI. Thus, silicone edge coated gaskets with overlapping face coatings covering less than 30 percent of the faces of the gasket base sheet provide exceptional sealability without significantly degrading the compression failure resistance of the base sheet.

Example 8

As discussed above, providing gaskets with coatings, and particularly face coatings, to increase sealability degrades the gasket's ability to resist compression failure. In general, the greater the facial surface covered by a coating, and the greater the coating's thickness, the lower the gasket's resistance to compression failure. It therefore is important to limit the width as well as the thickness of face coatings as much as possible while still obtaining the substantially enhanced sealability provided by such coatings. The test of this example is designed to explore the effect of face coating thickness and width on compression failure resistance.

For this test, identical annular gaskets were cut from a commercially available fibrous gasket sheet material. Nine specimens, specimens A through I, were then prepared for the test by applying different edge and face coatings to the gaskets as outlined in more detail below. Specimen A was left uncoated and was used as the control in this test. The specimens were then subjected to the crush test as outlined in Example 1 above to determine the effect the coatings in each sample on the compression failure resistance of the gasket.

Gasket B was provided with an edge coating with projecting rims protruding beyond the facial planes of the base sheet. No face coatings were present on this gasket. The edge coating profile for gasket B resembled the coating illustrated in FIG. 5. Gasket C was provided with face coatings extending in strips around the aperture of the gasket but was not provided with an edge coating. Each of the face coatings was measured to be from 3.2 to 4.2 mils in thickness and was 92 mils wide, as measured radially outward from the interior edge of the gasket base sheet. Gasket D was provided with a face coating on a portion of each face of the gasket with each face coating being from about 0.8 to about 1.2 mils in thickness and 92 mils wide, as measured radially outward from the interior edge of the gasket's base sheet. As with gasket C, gasket D was not provided with an edge coating on the interior edge of the base sheet. Gasket E also was provided with a face coating covering a portion of each face of the gasket. Each face coating was measured to be between about 3.2 and about 4.2 mils in thickness and was 188 mils wide, as measured radially outward from the interior edge of the base sheet. As with gaskets C and D, gasket E did not include an edge coating. Gasket F was provided with a face coating on each face that was measured to be from about 0.8 to about 1.2 mils in thickness and that was 188 mils wide, as measured radially outward from the interior edge of the base sheet. No edge coating was applied. Gasket G had a face coating on each face of the gasket that was from about 3.2 to about 4.2 mils in thickness and 282 mils wide, as measured radially outward from the interior edge of the gasket. No edge coating was applied. Gasket H was provided with a face coating on each face of the gasket that measured from about 0.8 mils to about 1.2 mils in thickness and that was 282 mils wide, as measured radially outward from the interior edge of the gasket. No edge coating was applied. Gasket I was provided a traditional release coating on each face of the gasket. The release coating was approximately 1 mil thick and covered the entire surface area of each face.

None of the coated gaskets for this test were provided with edge coatings. This is because it is known from other tests that edge coatings alone without any face coatings have little or no effect on the compression failure resistance of gaskets. The goal of the present test was to quantify the compression failure resistance of gaskets as a function of face coating width and thickness. Edge coatings were eliminated to isolate these parameters and to remove from the test any contribution, however small, from an edge coating.

The crush test in this example was conducted for each gasket at a temperature of 300 degrees Fahrenheit as specified by ASTM F1574-95. The test results are stated in terms of percentage change in a gasket's surface area from its original surface area before the test. The greater the change in surface area, the greater the compression of the gasket and the worse its compression failure resistance. As with the test of Example 1, a surface area change of greater than 10 percent is indicative of an unacceptable condition and is evidence that a gasket would exhibit unacceptable compression failure resistance. In general, the lower the change in surface area, the better the gasket will resist compression failure under actual conditions. The results of the test are tabulated below in Table 5.

TABLE 5

Compression Failure As A Function of Gasket Type and Flange Pressure

| Sample | 7500 PSI | 10000 PSI | 12500 PSI | 15000 PSI | 20000 PSI |
|---|---|---|---|---|---|
| A | 1.54 | 2.13 | 2.20 | 4.38 | |
| B | 2.13 | 2.33 | 3.53 | 3.59 | 4.57 |
| C | 3.76 | 5.42 | 6.28 | 9.53 | 19.51 |
| D | 2.47 | 3.59 | 3.73 | 6.84 | 14.51 |
| E | 8.82 | 14.32 | 16.85 | 28.01 | 42.98 |
| F | 2.35 | 5.98 | 7.79 | 15.49 | 35.00 |
| G | 12.76 | 20.84 | 33.72 | 41.50 | 100.00 |
| H | 1.98 | 5.62 | 12.26 | 31.81 | 43.66 |
| I | 0.56 | 1.03 | 1.60 | 3.16 | 3.54 |

One notable conclusion to be drawn from this data is that traditional release coatings on the faces of a gasket (gasket I) have little if any effect on the compression failure resistance of the gasket. As discussed hereinabove, these are coatings that are very thin and do not tend to penetrate the material of the gasket. In general, however, the data resulting from this test show that compression failure resistance varies as a function of flange pressure and as a function of the thickness and width of a face coating (other than a release coating) on the faces of a gasket.

The control gasket, gasket A, demonstrated good compression failure resistance at all flange pressures, as expected. Gasket B showed acceptable compression failure resistance at flange pressures of 20,000 PSI and below. Gasket C showed acceptable resistance at 15,000 PSI and below as did gasket D. Gasket E showed acceptable compression failure resistance at 7,500 PSI and below while gasket F showed acceptable performance at 12,500 PSI and below. Gasket G demonstrated unacceptable compression failure resistance at all flange pressures and gasket H showed acceptable performance only up to a 10,000 PSI flange pressure. Conclusions to be drawn from this test are that compression failure resistance indeed is a strong function of the application of face coatings, and particularly the width and thickness of such face coatings, on gasket base sheets. Face coatings covering less than 50 percent of the surface area of a gasket's face are preferred, with coverage less than 30 percent being most preferable, to provide sealability and compression failure resistance simultaneously.

Example 9

For the test of this example, two identical annular gaskets were cut from a cellulose-based paper gasket sheet material. Each gasket had a base sheet formed to define an interior aperture surrounded by an interior edge of the base sheet. The gaskets for this test each had an inner diameter of approximately 0.515 inches, and outer diameter of approximately 0.95 inches (for a flange width of approximately 0.2175 inches), and a thickness of 1/32 inches (or 0.031 mils). Gasket A was left completely uncoated and was used as the control. Gasket B was provided with an edge coating made of an acrylic latex coating material. No face coatings were applied to the gasket faces. The edge coating was wider than the thickness of the gasket base sheet and protruded beyond the facial planes of the base sheet on each side to define projecting rims surrounding the aperture of the gasket. The projecting rims were measured to protrude beyond the facial planes of the gasket by approximately 27 mils on each side. The thickness of the edge coating at approximately the mid portion of the interior edge of the base sheet was measured to be approximately 0.9 millimeters. The profile of the edge coating was similar to that shown in FIGS. 5 and 23.

Gaskets A and B were tested using the test cylinder pressurized with nitrogen to a pressure of 14 PSI and with the smooth flange (18 Ra). The elapsed time until the pressure decayed to 13 PSI was measured and noted. The control gasket, gasket A, resulted in a decay time of 1.5 minutes and required a flange pressure of 2100 PSI. Gasket B obtained a total seal (pressure never decreased measurably in the cylinder) at a flange pressure of 300 PSI. This test further demonstrates the exceptional qualities of edge coated gaskets made according to the present invention to provide outstanding sealability even at low flange pressures while at the same time preserving the compression failure resistance of the gasket base material.

While preferred embodiments of the gasket of this invention and preferred methodologies have been illustrated and described above, it will be appreciated that many variations of these embodiments are possible within the scope of the invention. Therefore, while the invention has been disclosed in preferred forms only, it will be obvious to those skilled in the art that no undue limits should be imposed on the invention except as set forth in the claims hereof. For example, it is contemplated that a cross-sectional profile of an edge and/or face coating according to the invention may take on a multitude of shapes and sizes other than those discussed herein and illustrated in the drawings, so long as the fundamental attributes of sealability and compression failure resistance are preserved. Furthermore, the list of possible coating materials provided herein is in no way exhaustive, and it is contemplated that other substances and materials, now known or to be discovered, may be suitable for fulfilling the requirements of an edge or face coating of the invention. These and other additions, deletions, and modifications may well be made to the preferred embodiments disclosed herein without departing from the spirit and scope of the invention as set forth in the claims.

What is claimed is:

1. A method of making edge coated gaskets comprising the steps of:
    (a) providing a plurality of base sheets each having opposed faces and at least one interior edge surrounding and defining an aperture;
    (b) stacking the plurality of base sheets together with their interior edges aligned with each other, the aligned edges defining and being exposed on the walls of a cavity;

(c) coating the walls of the cavity with a coating material by depositing coating material in the cavity, closing off the cavity, and rotating the stack of base sheets in such a way that the coating material flows around and progressively coats the walls of the cavity; and (d) removing individual base sheets from the stack, a strip of the coating material remaining on the interior edge of each removed base sheet to form an edge coated gasket.

2. A method of making edge coated gaskets as claimed in claim 1 and wherein step (b) further comprises stacking the base sheets on a base having a well formed therein, the well having the shape of and being aligned with the interior edges of the stacked gaskets, and wherein the step of depositing coating material in the cavity comprises at least partially filling the well with coating material.

3. A method of making edge coated gaskets as claimed in claim 2 and further comprising the step of tilting the stack and base prior to rotating the stack such that the coating material flows out of the well and onto the walls of the cavity.

4. A method of making edge coated gaskets as claimed in claim 3 and wherein the step of tilting the stack and base comprises tilting the stack and base until the walls of the cavity are substantially horizontally oriented.

5. A method of making edge coated gaskets as claimed in claim 4 and wherein the step of rotating the stack and base comprises rotating the stack and base through a predetermined number of rotations sufficient to deposit a coating of a desired thickness on the walls of the cavity.

6. A method of making edge coated gaskets as claimed in claim 4 and wherein step (d) includes separating individual base sheets from the stack before the coating material completely thickens, the coating material elongating along the line of separation to define protruding rims of coating material surrounding the apertures of the base sheets.

7. A method of making edge coated gaskets as claimed in claim 1 and wherein step (b) includes providing at least one spacer between each base sheet in the stack, the spacers having apertures aligned with the apertures of the base sheets.

8. A method of making edge coated gaskets as claimed in claim 7 and wherein a single spacer is provided between each base sheet in the stack, the aperture of each single spacer being larger than the aperture of the gaskets to form recessed areas between the base sheets, the coating material flowing into the recessed areas in step (c) to form face coatings on each base sheet surrounding the aperture thereof.

9. A method of making edge coated gaskets as claimed in claim 7 and wherein a single spacer is disposed between each base sheet in the stack, the single spacer having an aperture smaller than the apertures of the base sheets.

10. A method of making edge coated gaskets as claimed in claim 7 and wherein more than one spacer is disposed between each base sheet, the spacers having apertures sized to create molded face coatings on said base sheets.

11. A method of making edge coated gaskets comprising the steps of:

(a) providing a plurality of base sheets, each base sheet having opposed faces and an interior edge surrounding and defining an aperture of the base sheet;

(b) forming a stack from said plurality of base sheets with the interior edges of the base sheets being aligned with each other to define the walls of a cavity in the stack;

(c) depositing a predetermined amount of coating material in flowable form in the cavity;

(d) orienting the stack so that the walls of the cavity extend substantially horizontally;

(e) rotating the stack at a predetermined rate of rotation to cause the coating material to flow progressively around the walls of the cavity to deposit a coating layer on the exposed interior edges of the base sheets; and (f) removing individual base sheets from the stack, a portion of the coating layer remaining on the interior edge of each removed base sheet to form an edge coated gasket.

12. A method of making an edge coated gasket as claimed in claim 11 and wherein step (b) includes disposing at least one spacer between base sheets in the stack.

13. A method of making an edge coated gasket as claimed in claim 11 and wherein step (b) includes forming the stack atop a plate having a well closing one end of the cavity and wherein step (c) includes at least partially filling the well with coating material prior to orienting the stack.

14. A method of making an edge coated gasket as claimed in claim 11 and wherein step (f) comprises separating individual base sheets from the stack before the coating layer is completely thickened, the coating material deforming along the line of separation to form protruding rims of coating material surrounding the aperture of each gasket.

15. A method of making an edge coated gasket as claimed in claim 14 and further comprising the step of completing the thickening of the coating material on each gasket after the gaskets are separated from the stack to set the shape and properties of the edge coatings.

16. A method of making an edge coated gasket as claimed in claim 11 and wherein the coating material is a polymer.

17. A method of making an edge coated gasket as claimed in claim 11 and wherein the coating material is a latex.

18. A method of making an edge coated gasket as claimed in claim 11 and wherein the coating material is a powder fused coating.

19. A method of making an edge coated gasket comprising the steps of providing a plurality of base sheets each having opposed faces and an interior edge surrounding and defining an aperture, stacking the plurality of base sheets together with their apertures aligned to define the walls of a cavity, contacting the walls of the cavity with a coating material to deposit a layer of coating material on the aligned edges of the base sheets, and separating individual base sheets from the stack to form edge coated gaskets, the step of contacting the walls of the cavity with a coating material comprising depositing the coating material in the cavity and rotating the stack to cause the coating material to flow progressively around the walls of the cavity.

* * * * *